(12) United States Patent
Baxter, III

(10) Patent No.: US 7,136,959 B1
(45) Date of Patent: Nov. 14, 2006

(54) DATA STORAGE SYSTEM HAVING CROSSBAR PACKET SWITCHING NETWORK

(75) Inventor: William F. Baxter, III, Holliston, MA (US)

(73) Assignee: EMC Corporation, Hopkinton, MA (US)

( * ) Notice: Subject to any disclaimer, the term of this patent is extended or adjusted under 35 U.S.C. 154(b) by 535 days.

(21) Appl. No.: 10/675,058

(22) Filed: Sep. 30, 2003

(51) Int. Cl.
- G06F 13/00 (2006.01)
- H04L 12/56 (2006.01)
- G06F 15/16 (2006.01)

(52) U.S. Cl. ............ 710/317; 710/74; 711/113; 711/118; 711/147; 709/203; 370/257; 370/352; 370/912

(58) Field of Classification Search ........ 710/317, 710/100, 74; 711/112–114, 118, 147; 709/203, 709/213, 238; 370/257, 912
See application file for complete search history.

(56) References Cited

U.S. PATENT DOCUMENTS

| | | | |
|---|---|---|---|
| 6,751,703 B1 * | 6/2004 | Chilton | 711/113 |
| 6,754,769 B1 * | 6/2004 | Kawano | 711/114 |
| 6,970,972 B1 * | 11/2005 | Hosoya | 711/113 |
| 2002/0083270 A1 * | 6/2002 | Chilton | 711/130 |
| 2004/0128346 A1 * | 7/2004 | Melamed et al. | 709/203 |
| 2004/0139365 A1 * | 7/2004 | Hosoya | 714/5 |
| 2005/0071424 A1 * | 3/2005 | Baxter, III | 709/203 |
| 2005/0071556 A1 * | 3/2005 | Walton et al. | 711/114 |
| 2005/0267986 A1 * | 12/2005 | Murakami et al. | 709/238 |

OTHER PUBLICATIONS

"High-performance network and channel based storage" by R.H. Katz (abstract only) Publication Date: Aug. 1992.*

* cited by examiner

Primary Examiner—Gopal C. Ray

(57) ABSTRACT

A system interface having: a packet switching network; a cache memory; and a plurality of directors. One portion of such directors is adapted for coupling to a host computer/server and another portion of the directors is adapted for coupling to a bank of disk drives, the plurality of directors and cache memory being interconnected through the packet switching network. Each one of the directors is coupled to a crossbar switch. The cross bar switch is directly connected to at least two other ones of the cross bar switches networks and indirectly connected to of other ones of the crossbar switches through the at least two directly connected crossbar switches.

5 Claims, 22 Drawing Sheets

| COMMAND | DESTINATION ID | SOURCE ID | ADDRESS | PAYLOAD | CRC |

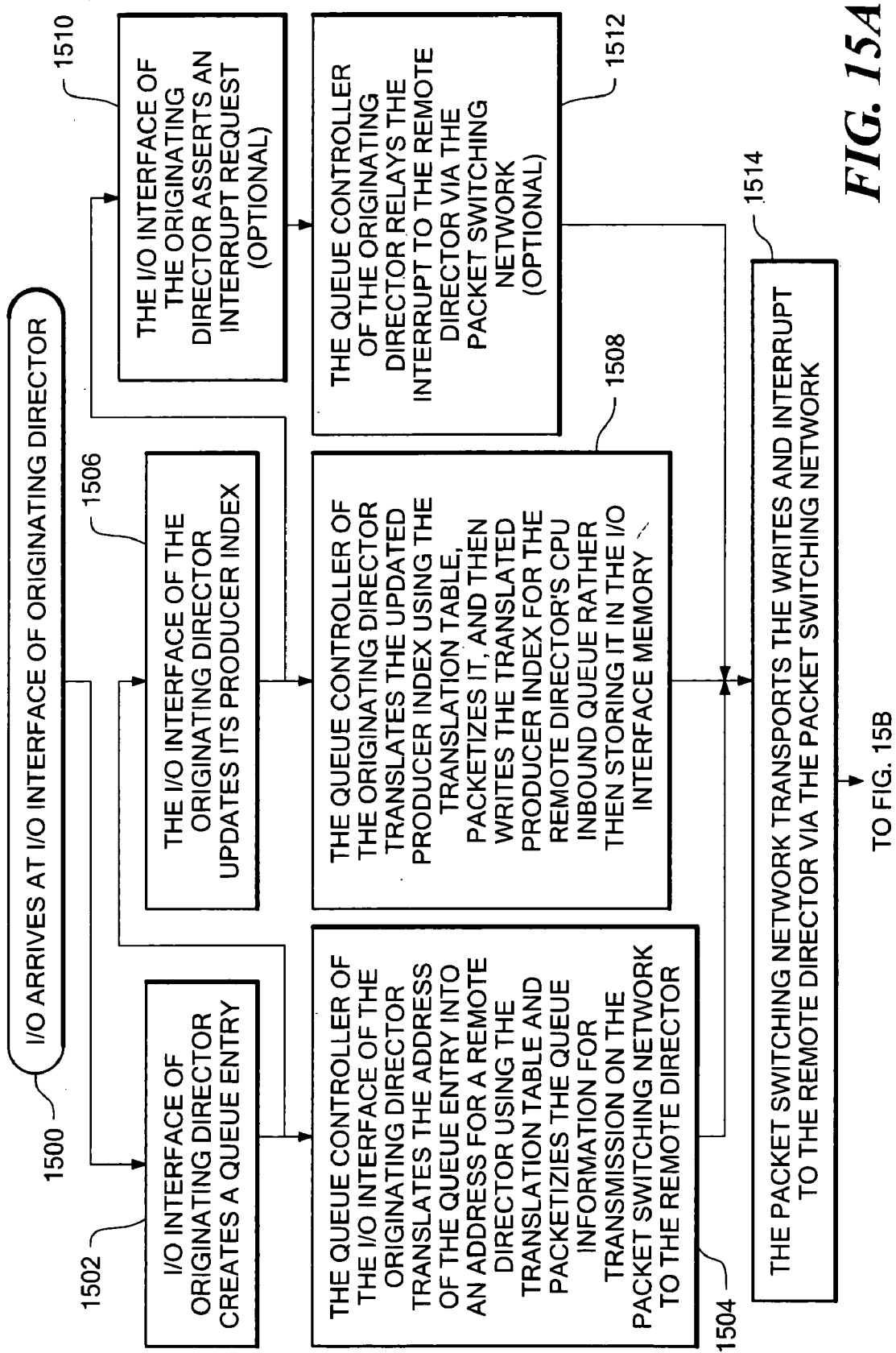

Translation Table Format

| Remote CPU Number | Remote Producer Index | Remote Consumer Index | Misc. Remote Info |
|---|---|---|---|
| Remote CPU Number | Remote Producer Index | Remote Consumer Index | Misc. Remote Info |
| Remote CPU Number | Remote Producer Index | Remote Consumer Index | Misc. Remote Info |
| Remote CPU Number | Remote Producer Index | Remote Consumer Index | Misc. Remote Info |
| Remote CPU Number | Remote Producer Index | Remote Consumer Index | Misc. Remote Info |
| Remote CPU Number | Remote Producer Index | Remote Consumer Index | Misc. Remote Info |
| Remote CPU Number | Remote Producer Index | Remote Consumer Index | Misc. Remote Info |
| Remote CPU Number | Remote Producer Index | Remote Consumer Index | Misc. Remote Info |

*FIG. 17*

DATA STORAGE SYSTEM HAVING CROSSBAR PACKET SWITCHING NETWORK

This application incorporates by reference, in their entirety, the following co-pending patent applications all assigned to the same assignee as the present invention:

| INVENTORS | FILING DATE | SERIAL NO. | TITLE |
| --- | --- | --- | --- |
| Yuval Ofek et al. | Mar. 31, 2000 | 09/540,828 | Data Storage System Having Separate Data Transfer Section And Message Network |
| Paul C. Wilson et al. | Jun. 29, 2000 | 09/606,730 Now U.S. Pat. No. 7,007,184 | Data Storage System Having Point-To-Point Configuration |
| John K. Walton et al. | Jan. 22, 2002 | 10/054,241 Now U.S. Pat. No. 6,988,152 | Data Storage System (Divisional of 09/223,519 filed Dec. 30, 1998) Now U.S. Pat. No. 6,389,494 |
| Christopher S. MacLellan et al. | Dec. 21, 2000 | 09/745,859 Now U.S. Pat. No. 6,604,176 | Data Storage System Having Plural Fault Domains |
| John K. Walton | May 17, 2001 | 09/859,659 Now U.S. Pat. No. 7,010,740 | Data Storage System Having No-Operation Command |
| Kendall A. Chilton | Jun. 26, 2002 | 10/180,751 | Data Storage System Having Cache Memory Manager |

BACKGROUND OF THE INVENTION

This invention relates generally to data storage systems, and more particularly to data storage systems having redundancy arrangements to protect against total system failure in the event of a failure in a component or subassembly of the storage system.

As is known in the art, large host computers and servers (collectively referred to herein as "host computer/servers") require large capacity data storage systems. These large computer/servers generally includes data processors, which perform many operations on data introduced to the host computer/server through peripherals including the data storage system. The results of these operations are output to peripherals, including the storage system.

One type of data storage system is a magnetic disk storage system. Here, as shown in FIG. 1, a bank of disk drives and the host computer/server are coupled together through a system interface. The interface includes "front end" or host computer/server controllers (or directors) and "back-end" or disk controllers (or directors). The interface operates the controllers (or directors) in such a way that they are transparent to the host computer/server. That is, data is stored in, and retrieved from, the bank of disk drives in such a way that the host computer/server merely thinks it is operating with its own local disk drive. One such system is described in U.S. Pat. No. 5,206,939, entitled "System and Method for Disk Mapping and Data Retrieval", inventors Moshe Yanai, Natan Vishlitzky, Bruno Alterescu and Daniel Castel, issued Apr. 27, 1993, and assigned to the same assignee as the present invention.

As described in such U.S. Patent, the interface may also include, in addition to the host computer/server controllers (or directors) and disk controllers (or directors), addressable cache memories. The cache memory is a semiconductor memory and is provided to rapidly store data from the host computer/server before storage in the disk drives, and, on the other hand, store data from the disk drives prior to being sent to the host computer/server. The cache memory being a semiconductor memory, as distinguished from a magnetic memory as in the case of the disk drives, is much faster than the disk drives in reading and writing data.

As is also known in the art it is desirable to provide an interface with maximum data bandwidth, minimum system latency and minimum cost.

SUMMARY OF THE INVENTION

In accordance with the present invention, a system interface is provided having a packet switching network, a cache memory, and a plurality of directors, one portion of such directors being adapted for coupling to a host computer/server and another portion of the directors being adapted for coupling to a bank of disk drives. The plurality of directors and cache memory are interconnected through the packet switching network. Each one of the directors is coupled to a crossbar switch. The cross bar switch is directly connected to at least two other ones of the cross bar switches networks and indirectly connected to of other ones of the crossbar switches through the at least two directly connected crossbar switches.

In such embodiment, the packet switching network comprises the crossbar switches of the directly and indirectly connected crossbar switches.

In one embodiment, the system interface includes a plurality of the packet switching networks. Each one of the packet switching networks includes: a plurality of cross bar switches. Each cross bar switch is connected: (1) directly to crossbar switches of at least two other ones of crossbar switches in such one of the packet switching networks and to one of the cross bar switches of a second one of the plurality of packet switching networks; and, (2) indirectly to other ones of the crossbar switches of such one of the packet switching networks via the crossbar switch directly connected to such one of the packet switching network. Two of said at least two other ones of the crossbar switches in such one of the packet switching networks are connected indirectly to two cross bar switches of the second one of the packet switching networks. The two cross bar switches of the second one of the packet switching networks are cross bar switches connected indirectly to said one of the cross bar switches of the second one of the plurality of packet switching networks.

In one embodiment, the cache memory includes a plurality of cache memory sections, each one of such sections being coupled to a corresponding one of the crossbar switches.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

These and other features of the invention will become more readily apparent from the following detailed description when read together with the accompanying drawings, in which:

FIG. 17 is a diagram of a translation table used in the flow diagrams of FIGS. 15 and 16.

The details of one or more embodiments of the invention are set forth in the accompanying drawings and the description below. Other features, objects, and advantages of the invention will be apparent from the description and drawings, and from the claims.

Like reference symbols in the various drawings indicate like elements.

DETAILED DESCRIPTION

Figure 1:
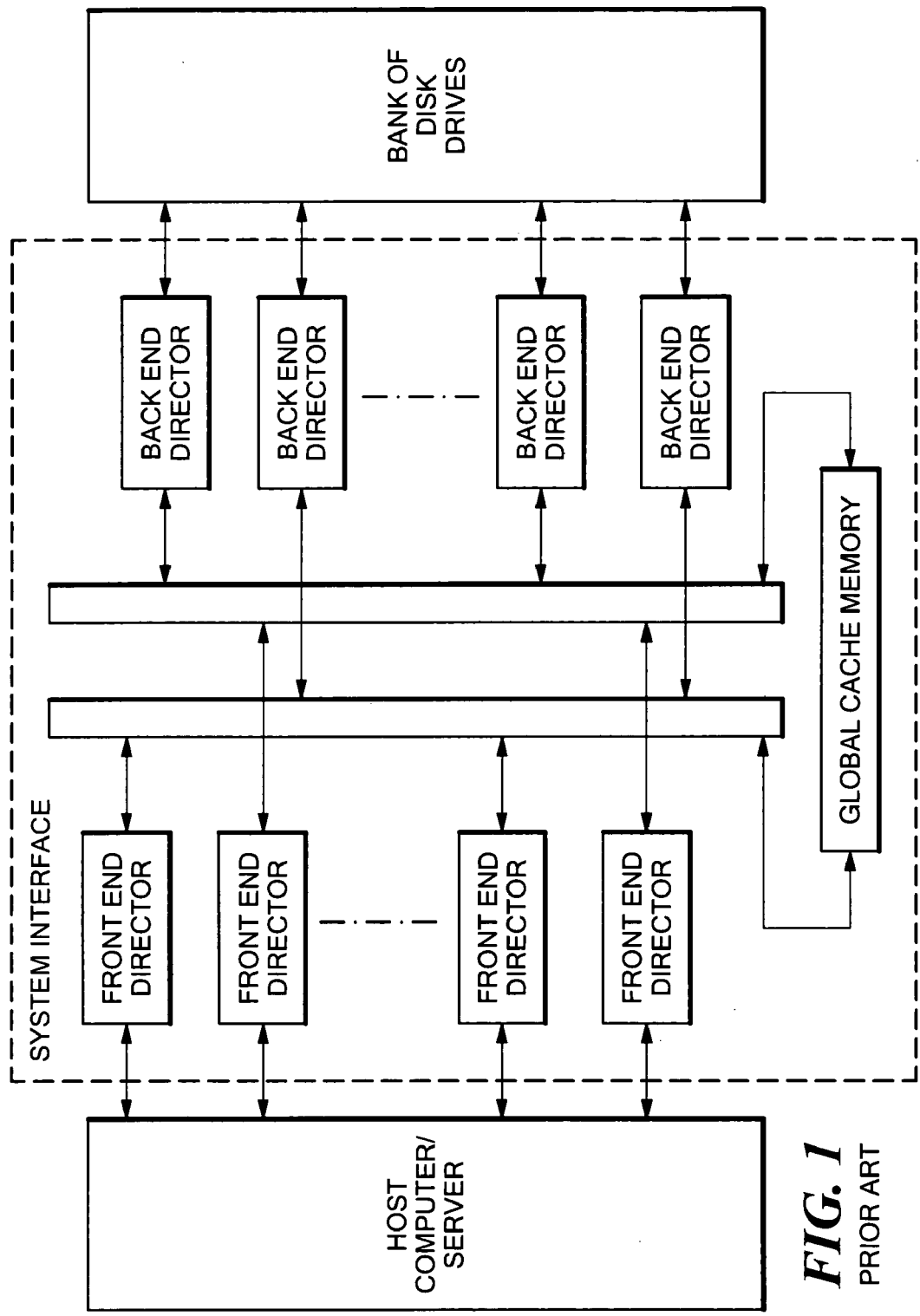
FIG. 1 is a block diagram of a data storage system according to the PRIOR ART.
Figure 2:
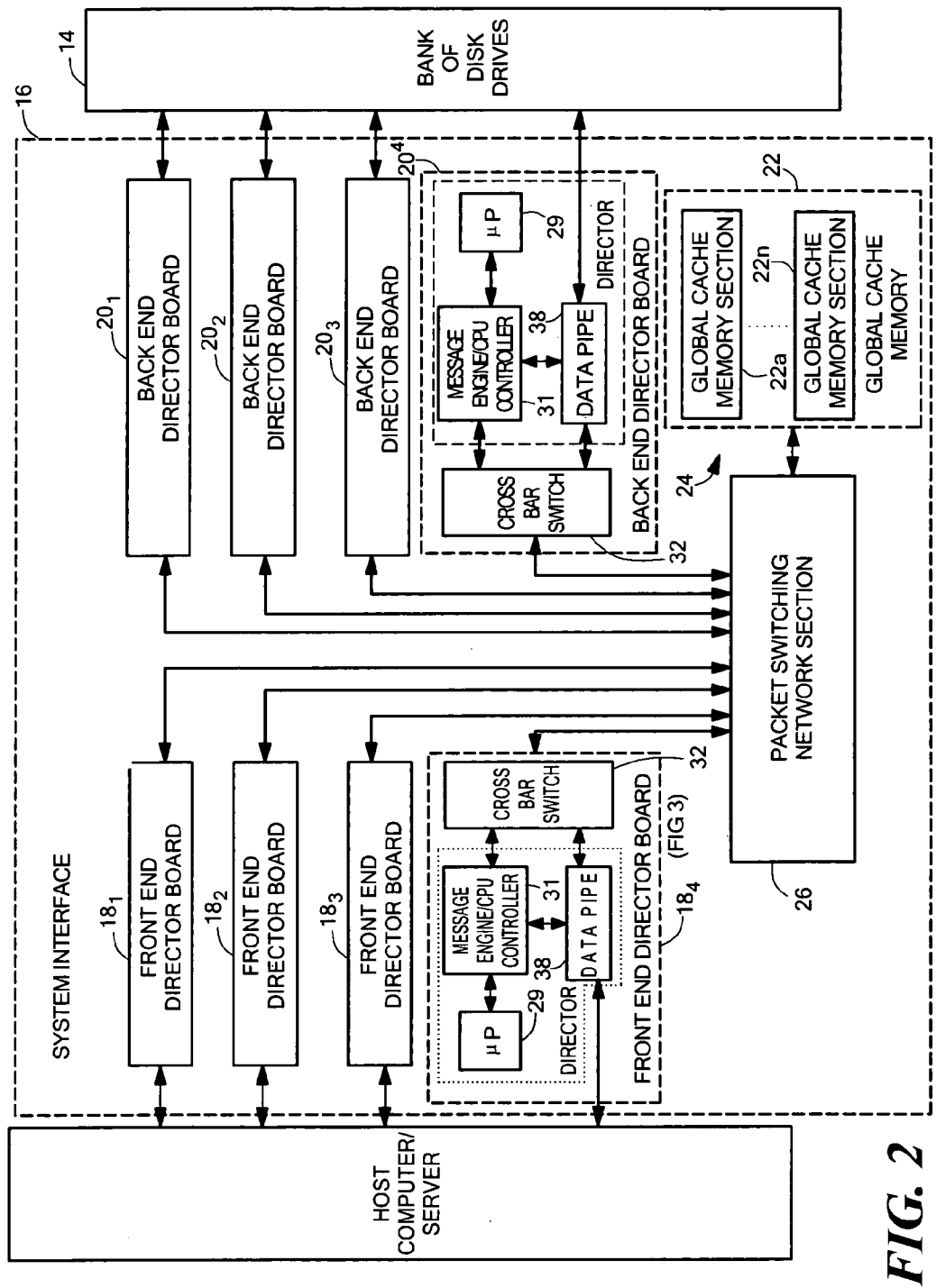
FIG. 2 is a block diagram of a data storage system according to the invention.

Referring now to FIG. 2, a data storage system 10 is shown for transferring data between a host computer/server 12 and a bank of disk drives 14 through a system interface 16. The system interface 16 includes: a plurality of, here for example four, front-end directors $18_1$–$18_4$ coupled to the host computer/server 12; a plurality of, here for example, four, back-end directors $20_1$–$20_4$ coupled to the bank of disk drives 14. The interface 16 includes a data transfer section 24, having a global cache memory 22. The global cache memory includes a plurality of, here, n, global cache memory sections $22_a$–$22_n$, as shown. The front-end and back-end directors $18_1$–$18_4$, $20_1$–$20_4$ and the global cache memory communicate with one another through a packet switching network. The packet switching network includes crossbar switches 32 coupled to each one the directors, as shown, and a packet switching network section 26.

The front-end and back-end directors $18_1$–$18_4$, $20_1$–$20_4$ are functionally similar and include a microprocessor (µP) 29 (i.e., a central processing unit (CPU) and RAM), a message engine/CPU controller having a message engine and a memory controller 37; and, a data pipe 38, arranged as shown and described in more detail in co-pending patent application Ser. No. 09/540,828 filed Mar. 31, 2000, inventor Yuval Ofek et al., assigned to the same assignee as the present invention, the entire subject matter thereof being incorporated by reference. Suffice it to say here, however, that the front-end and back-end directors $18_1$–$18_4$, $20_1$–$20_4$ control data transfer between the host computer/server 12 and the bank of disk drives 14 in response to messages passing between the directors $18_1$–$18_4$, $20_1$–$20_4$ through the packet switching network. The messages facilitate the data transfer between host computer/server 12 and the bank of disk drives 14 with such data passing through the global cache memory 22 via the data transfer section 24. More particularly, in the case of the front-end directors $18_1$–$18_4$, the data passes between the host computer to the global cache memory 22 through the data pipe 31 in the front-end directors $18_1$–$18_4$ and the messages pass through the message engine/CPU controller 31 in such front-end directors $18_1$–$18_4$. In the case of the back-end directors $20_1$–$20_4$ the data passes between the back-end directors $20_1$–$20_4$ and the bank of disk drives 14 and the global cache memory 22 through the data pipe 38 in the back-end directors $20_1$–$20_4$ and again the messages pass through the message engine/CPU controller 31 in such back-end director $20_1$–$20_4$.

Figures 2A, 3:
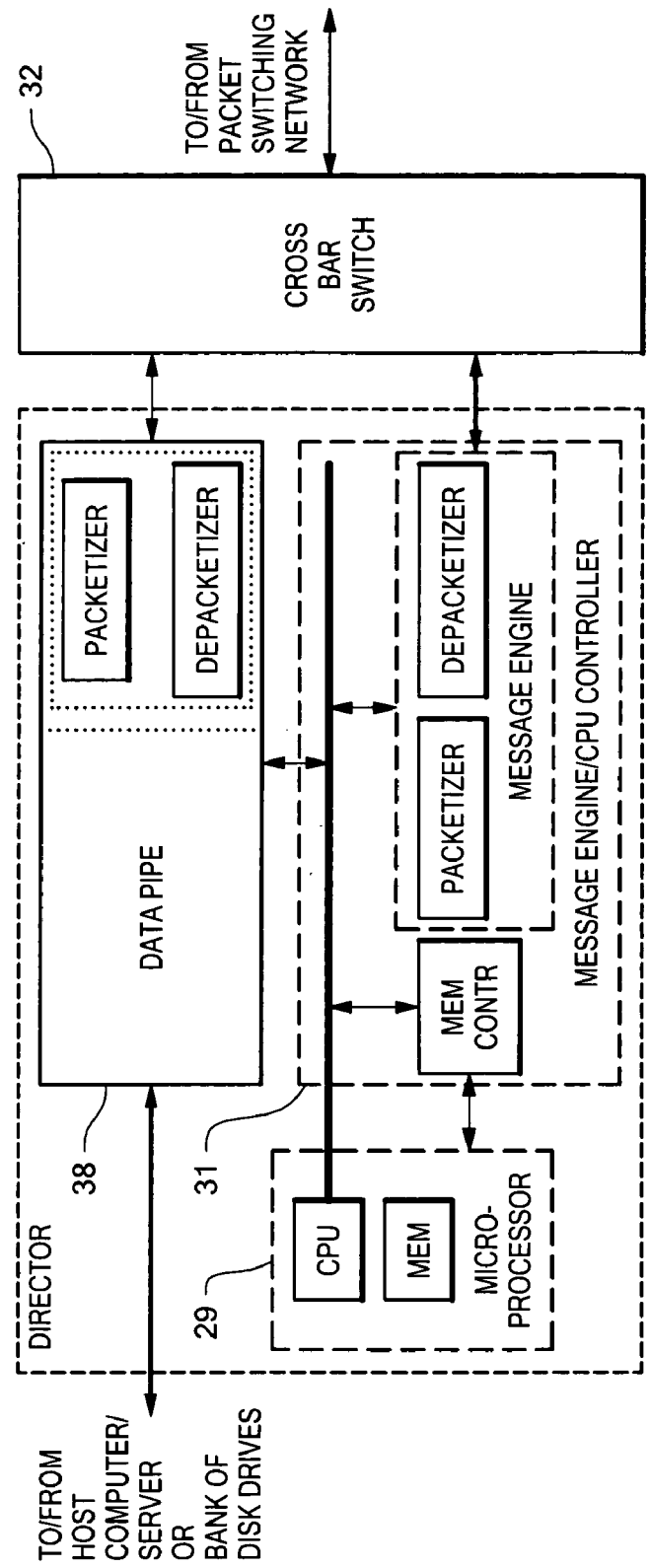
FIG. 2A is a diagram of a packet used in the data storage system of FIG. 2.
FIG. 3 is a block diagram of an exemplary one of the directors used in the system of FIG. 2.

It is noted that here the front-end and back-end directors $18_1$–$18_4$, $20_1$–$20_4$ are coupled to the crossbar switch 32, as shown in more detail in FIG. 3. The crossbar switch 32, here a switching fabric, is also coupled to the packet switching network 26 to provide the packet switching network for the system interface 16.

Each message which is created by the microprocessor 29 under software control is stored in a send queue in RAM, not shown. When the message is to be read from the send queue in RAM, not shown, and transmitted through the message network 26 (FIG. 2) to one or more other directors via a DMA operation it is packetized in a packetizer into a packet, shown in FIG. 2A. For directors, each one of the packets includes the following fields: command; a source ID (i.e., transmitting director); a destination ID (i.e., receiving director) address; a payload; and terminates with a 4-byte Cyclic Redundancy Check (CRC), as shown in FIG. 2A. For data passing to and from the global memory, each one of the packets includes the following fields: command (e.g., read, write); a source ID (i.e., transmitting source) and destination ID (i.e., receiving memory location (i.e., the location in global memory for the configuration shown in FIG. 2, or the director board ID having the global cache memory section and offset, as with the configuration to be described in FIG. 5).

The packet is sent to the crossbar switch 32. The destination portion of the packet is used to indicate the destination for the message and is decoded by the switch 32 to determine the message routing through the packet switching network section 26. The decoding process uses a routing table, not shown, in the packet switching network section 26, such routing table being initialized by controller during power-up by the initialization and diagnostic processor (controller), not shown. The routing table provides the relationship between the destination address portion of the packet, which identifies the routing for the message and the one of directors $18'_1$–$18_4$, $20_1$–$20_{34}$ to which the message is to be directed.

Here, referring also to FIG. 3, the data pipe 38 also includes a packetizer and depacketizer to transmit and receive the data to and from the cache memory 22 using the same transmission, i.e., packet protocol, as that used by the message engine/CPU controller. The destination portion of the packet is used to indicate the destination, i.e., address in the cache memory 22 for storage of the data during a write or retrieval of data stored in the cache memory 22 during a read and is decoded by the switch 32 to determine the message routing through the packet switching network 26. The decoding process uses a decoder table, not shown, in the packet switching network 26, such routing table being initialized by controller during power-up by the initialization and diagnostic processor (controller), not shown. The table provides the relationship between the destination address portion of the packet, which identifies the routing for the data and the location in the cache memory for writing or reading the data, as the case may be.

Figure 4:
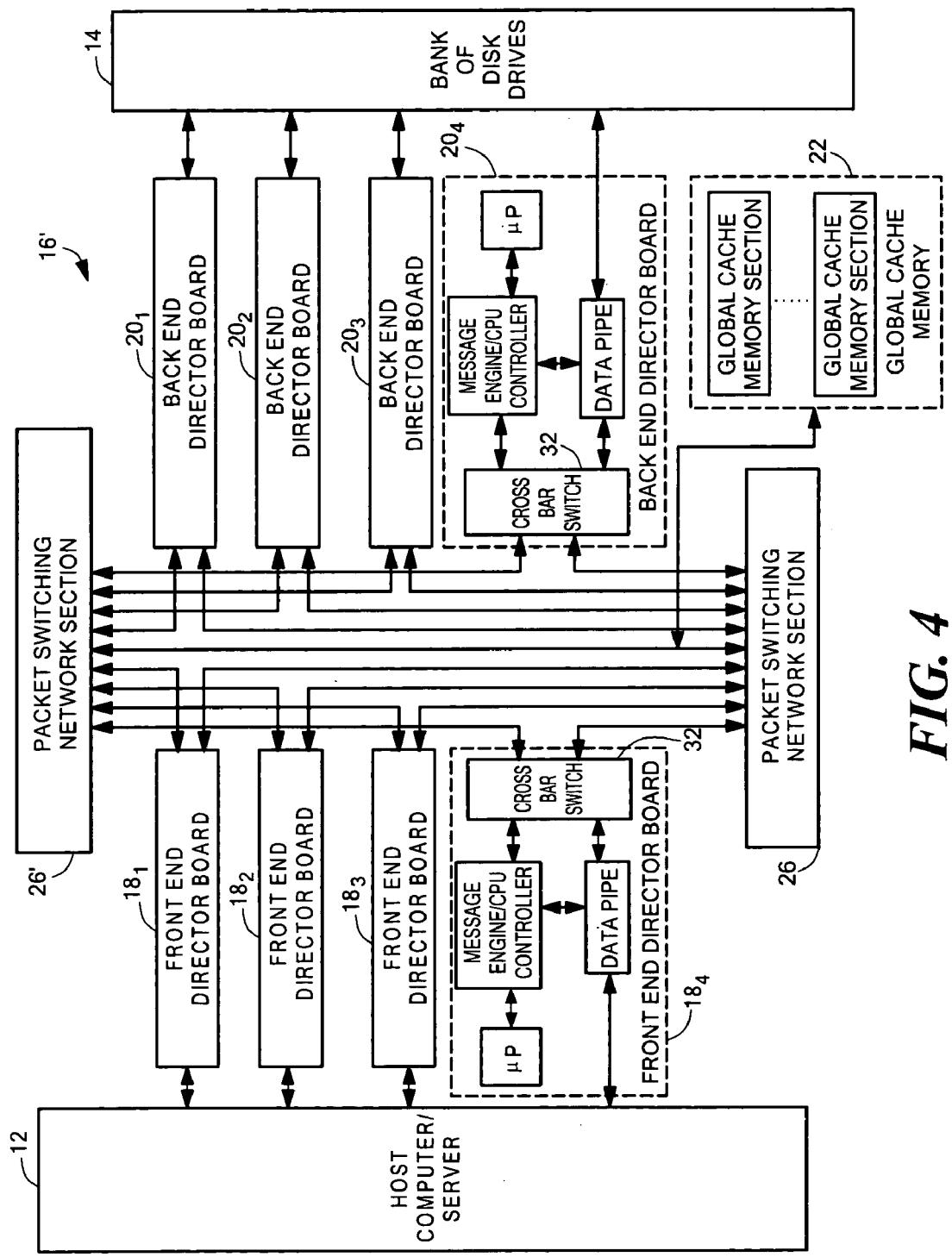
FIG. 4 is a block diagram of a data storage system according to an alternative embodiment of the invention.

Referring now to FIG. 4, an alternative embodiment of the system interface 16, designated as system interface 16', is shown. Here, a redundant packet switching network 16' is included. It should be noted that the system may use a single packet switching network where such packet switching network includes sufficient redundant connections to allow full system connectivity in the event of a failure as shown in FIGS. 8, 9A–9C, to be described.

Figure 5:
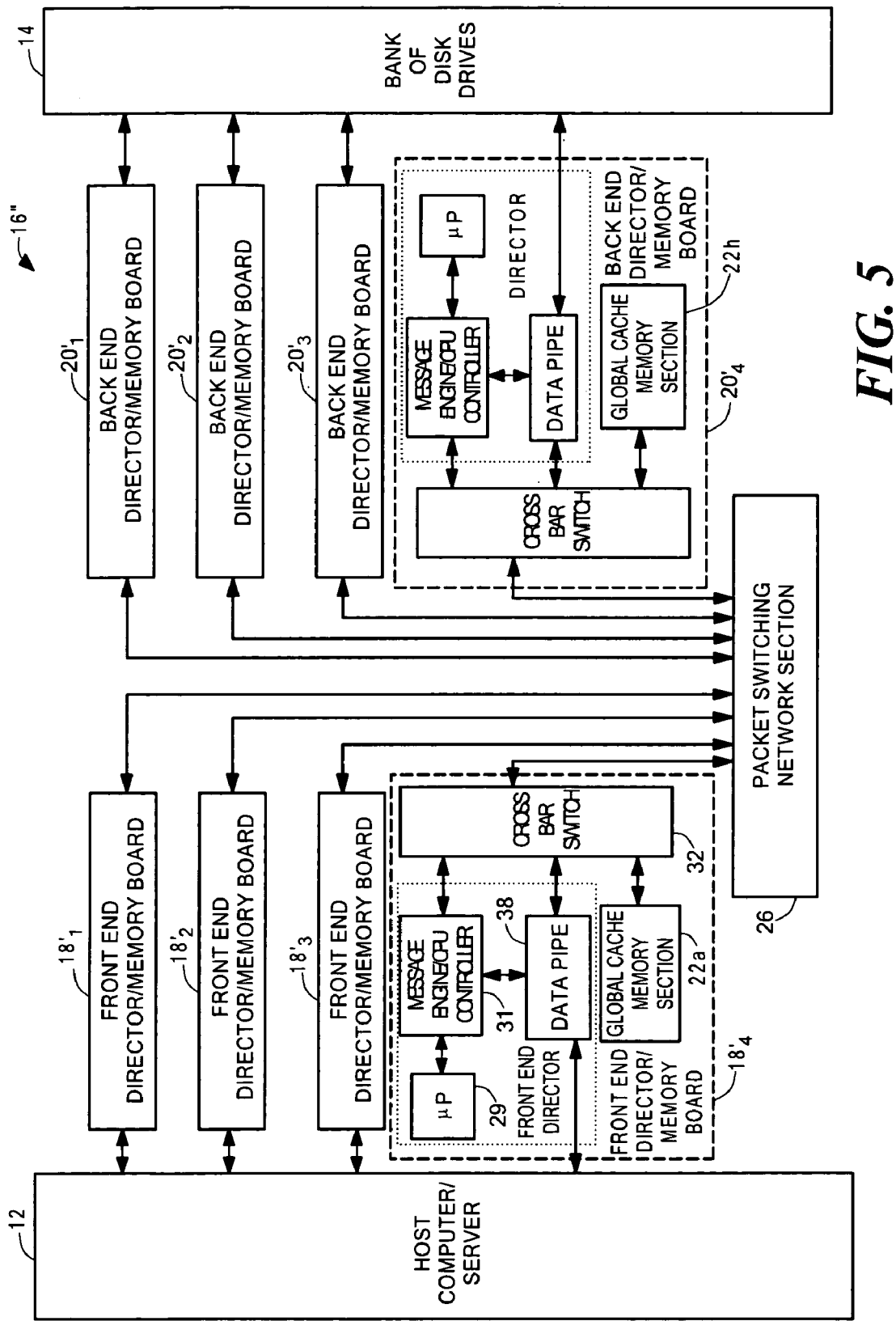
FIG. 5 is a block diagram of a data storage system according to an alternative embodiment of the invention.

Referring now to FIG. 5, an alternative embodiment of the system interface 16, designated as system interface 16", is shown. Here, the system interface 16" includes a plurality of, here for example four, front-end director/memory boards $18'_1$–$18'_4$ coupled to the host computer/server 12; a plurality of, here for example, four, back-end director/memory boards $20'_1$–$20'_4$ coupled to the bank of disk drives 14. The interface 16" includes a data transfer section having a global cache memory, the global memory cache 22 has the global cache memory sections thereof, here sections $22_a$–$22_n$, here $22'_1$–$22'_8$ distributed among the front-end director/memory boards $18'_1$–$18'_4$ and the back-end director/memory boards $20'_1$–$20'_4$, respectively as shown.

Figure 6:
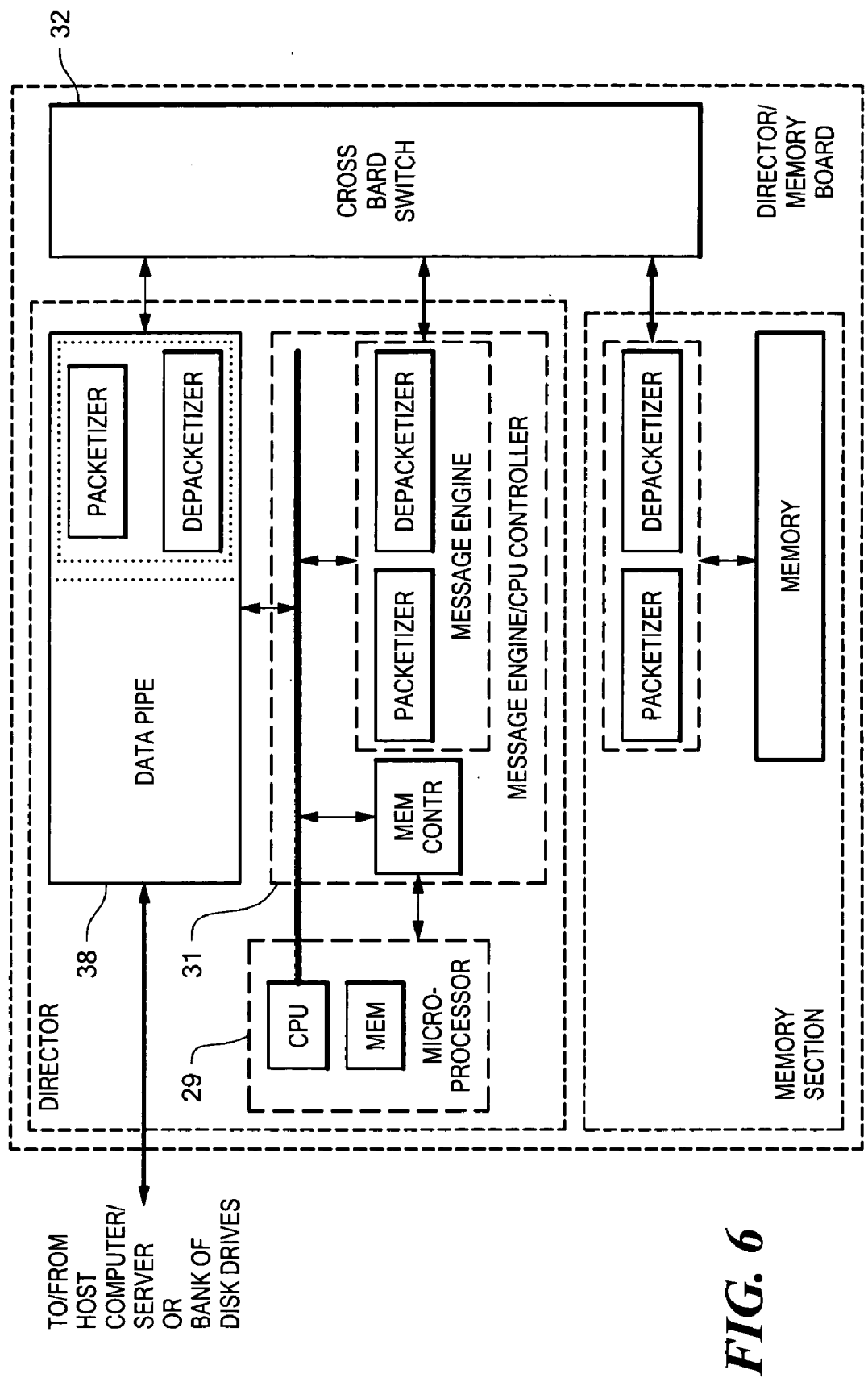
FIG. 6 is a block diagram of an exemplary director/memory board adapted for use in the system of FIG. 5.

An exemplary one of the front-end director/memory boards $18'_1$–$18'_4$ and the back-end director/memory boards $20'_1$–$20'_4$ is shown in FIG. 6. It is noted that because here packet switching is being used, the memory section includes a packetizer and depacketizer to enable a common packet switching protocol to be used for the data pipe, the message engine/CPU controller and the memory section. The data packet passed to and from the global memory is shown in FIG. 2A. It is also noted that a memory section on a director/memory board is able to communicate with the data pipe on the same board via the crossbar switch on such board. Thus, as noted above, the crossbar switches are part of the overall packet switching network. Thus, the front-end and back-end directors $18_1$–$18_4$, $20_1$–$20_4$ and the global cache memory sections $22_1$–$22_8$ communicate with one another through the packet switching network as described above, such network including the crossbar switches and the packet switching section 26.

Figure 7:
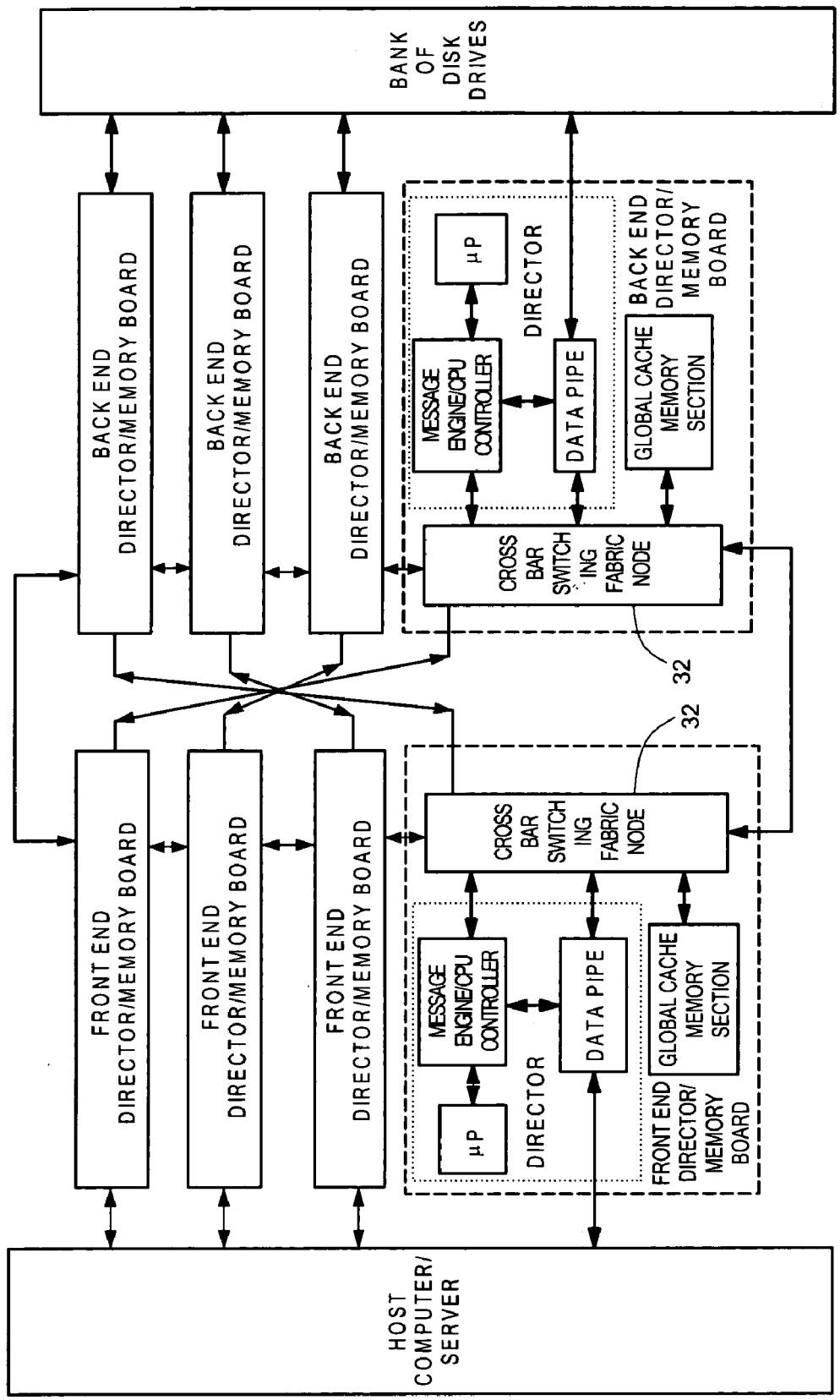
FIG. 7 is a block diagram of a data storage system according to another embodiment of the invention.
Figure 7A:
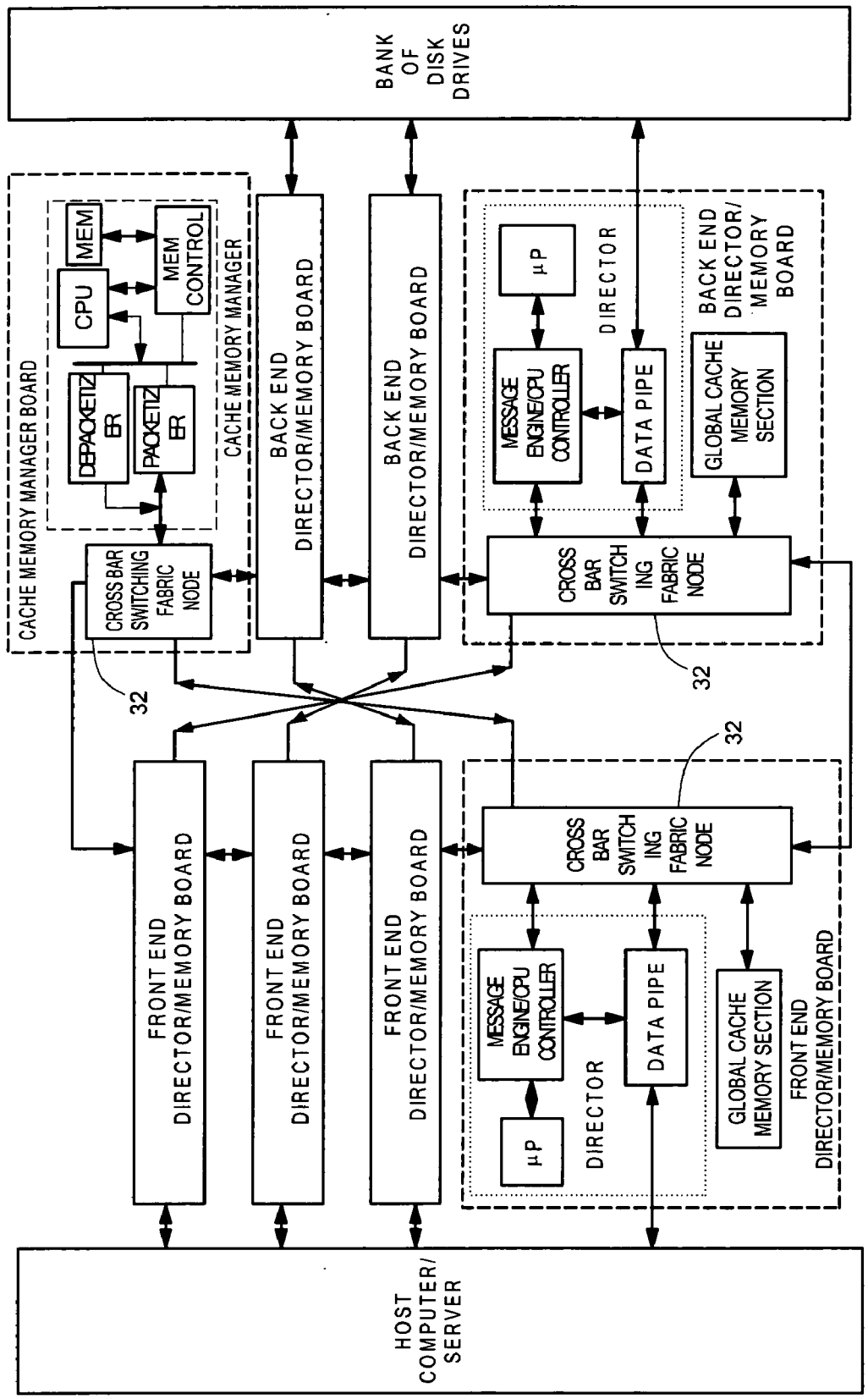
FIG. 7A is a block diagram of a data storage system according to another embodiment of the invention.

Referring now to FIG. 7A, an alternative embodiment of the system interface is shown. Here, one of the boards is a cache memory manager as described in the above-referenced U.S. patent application Ser. No. 10/180,751.

Figure 8:
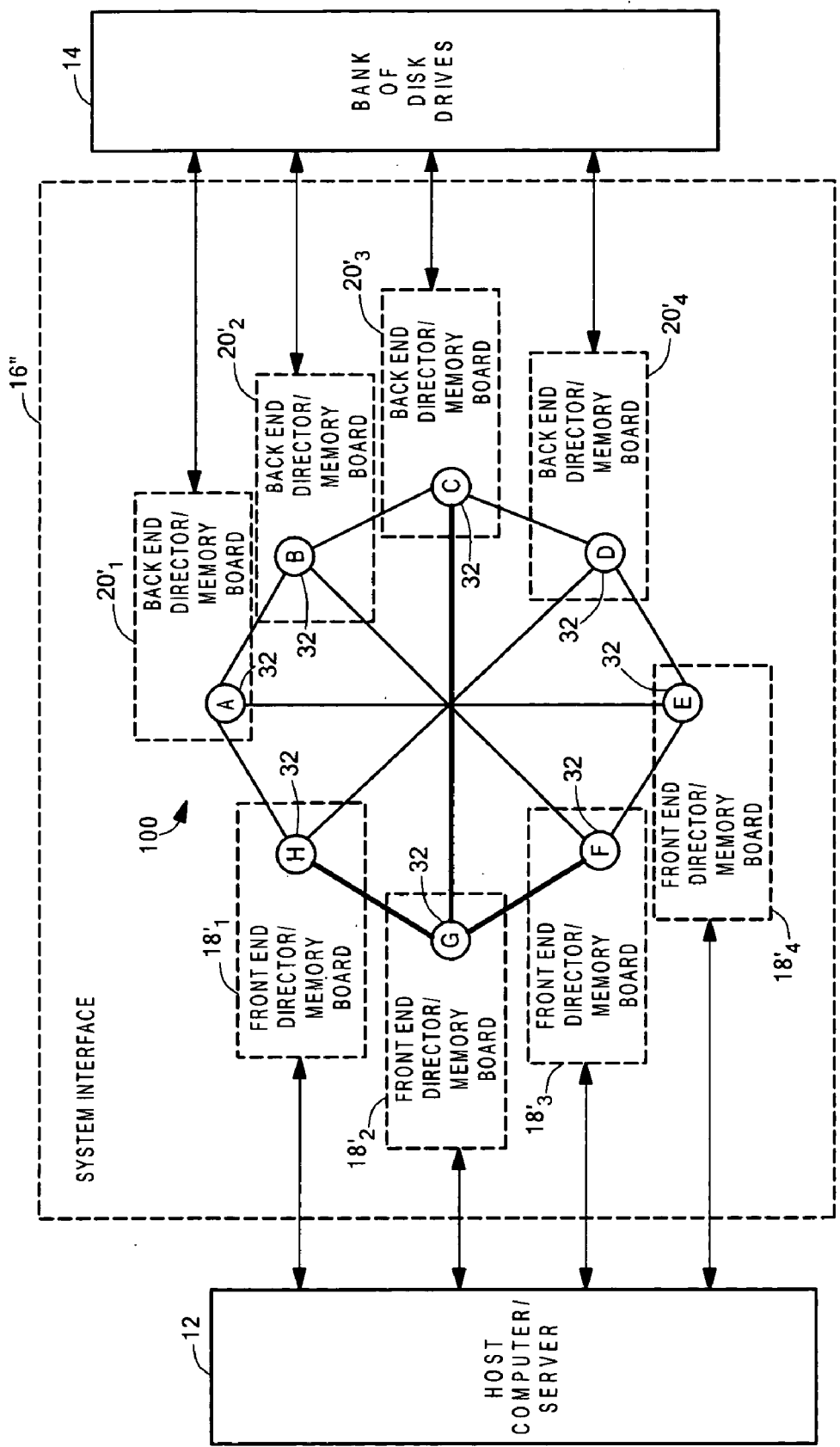
FIG. 8 is a block diagram of a data storage system according to the invention as configured in FIG. 7 having eight director/memory boards.

Referring to FIG. 7 an alternative embodiment of the system interface is shown. Here, instead of coupling each one of the crossbar switches to the packet switching network section 26 to provide the packet switching network for the system interface, the crossbars switches are interconnected as shown in FIGS. 7 and 8. Thus, as shown in FIG. 8, each crossbar switch may be considered as a switching node, here designated as nodes A through H. Thus, the crossbar switches for nodes A–H provide a packet switching network 100.

Thus, as noted above in connection with FIG. 7, each one of the directors is coupled to a crossbar switch. The crossbar switch is directly connected to crossbar switch of at least two other ones of the directors and indirectly connected to crossbar switching fabric of other ones of the directors through the at least two directly connected directors. Thus:

Crossbar switch A is directly connected to crossbar switches B, E and H and is indirectly coupled to the other ones of the crossbars switches (i.e., switches C, D, F, and G) though one of directly connected crossbars switches B, E and H. For example, switch D is indirectly coupled to switch A through directly connected switch H.

Crossbar switch B is directly connected to crossbar switches A, C and F and is indirectly coupled to the other ones of the crossbars switches (i.e., switches D, E, G, and H) though one of directly connected the crossbars switches A, C and F.

In like manner, crossbar switch C is directly connected to crossbar switches B, D and G and is indirectly coupled to the other ones of the crossbars switches. Crossbar switch D is directly connected to crossbar switches C, E and H. Crossbar switch E is directly connected to crossbar switches D, F and A. Crossbar switch F is directly connected to crossbar switches E, G and B and is indirectly coupled to the other ones of the crossbar switches. Crossbar switch G is directly connected to crossbar switches H, F and C and is indirectly coupled to the other ones of the crossbar switches. Crossbar switch H is directly connected to crossbar switches A, G and D and is indirectly coupled to the other ones of the crossbar switches.

Thus, each one of the directors is coupled to a crossbar switch. The switch is directly connected to crossbar switch of at least two other ones of the crossbar switches and indirectly connected to other ones of the crossbar switches through the at least two directly connected crossbar switches. Thus, as noted above, the packet switching network comprises the crossbar switches of the directly and indirectly connected crossbar switch.

Figure 9A:
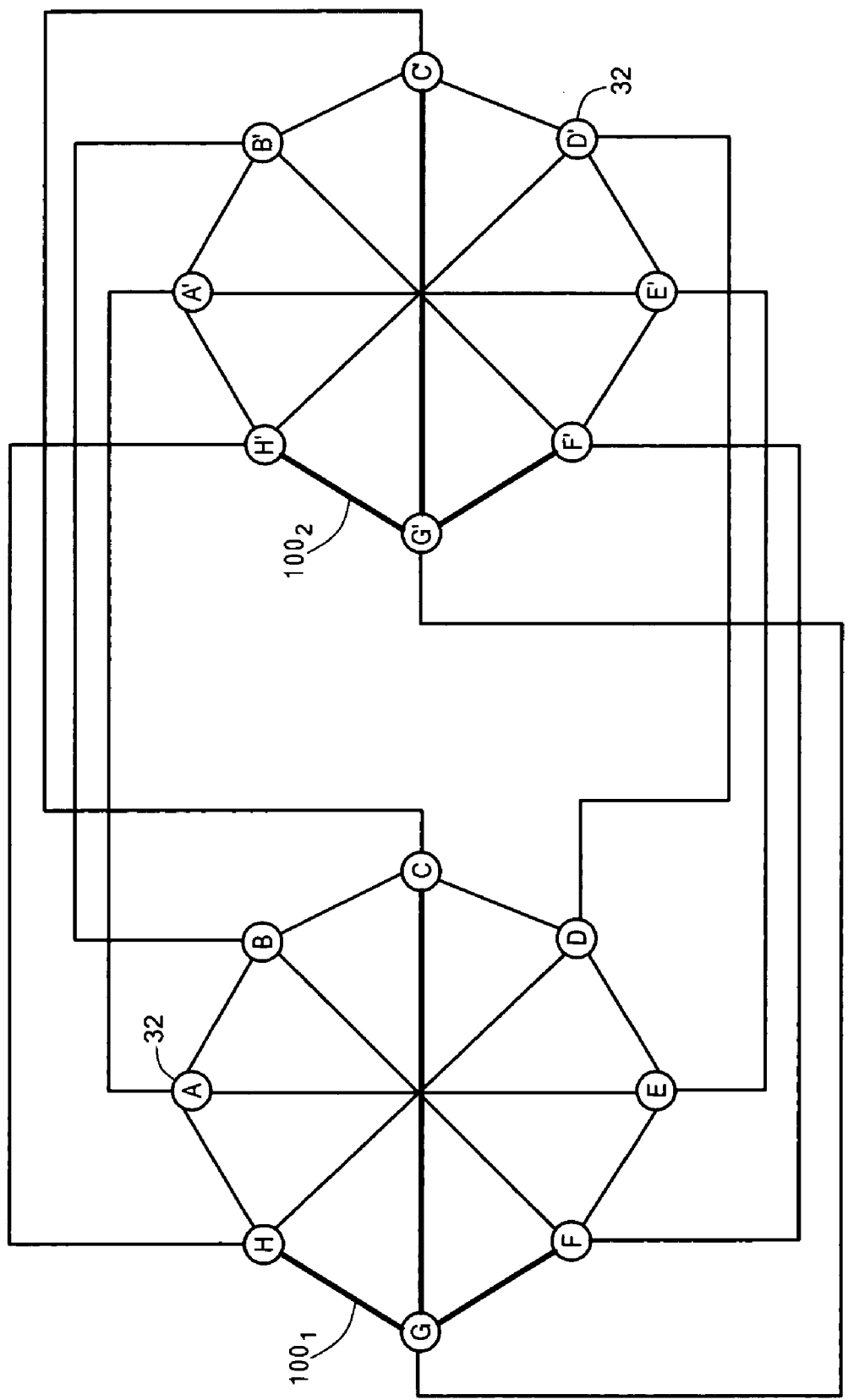
FIG. 9A is a diagram of a data storage system according to the invention as configured in FIG. 7 having sixteen director/memory boards.

Referring now to FIG. 9A, a pair of interconnected packet switching networks $100_1$, $100_2$ is shown to provide a packet switching network for sixteen directors or sixteen director/memory boards. Thus, the connection of the nodes of network $100_1$ to the nodes of network $100_2$ are presented in below:

Node A of network $100_1$ is connected directly to Node A of network $100_2$;

Node B of network $100_1$ is connected directly to Node B of network $100_2$;

Node C of network $100_1$ is connected directly to Node C of network $100_2$;

Node D of network $100_1$ is connected directly to Node D of network $100_2$;

Node E of network $100_1$ is connected directly to Node E of network $100_2$;

Node F of network $100_1$ is connected directly to Node F of network $100_2$;

Node G of network $100_1$ is connected directly to Node G of network $100_2$;

Node H of network $100_1$ is connected directly to Node H of network $100_2$.

It should be noted that with such connections, information sent by each one of the nodes (i.e., a source node) of one of the networks $100_1$, $100_2$ may be required to pass to two nodes of the other network before reaching a destination node of the other network (i.e., two hops are required). For example, considering node G of network $100_1$ as the source node and node D of network $100_2$ as the destination node, information from the source node G of network $100_1$ must pass through, for example, node H of network $100_1$ and then through node H of network $100_2$ before reaching destination node D of network $100_2$. Likewise, again considering node G of network $100_1$ as the source node and node B of network $100_2$ as the destination node, information from the source node G of network $100_1$ must pass through, for example, node F of network $100_1$ and then through node F of network $100_2$ before reaching destination node D of network $100_2$.

Figure 9B:
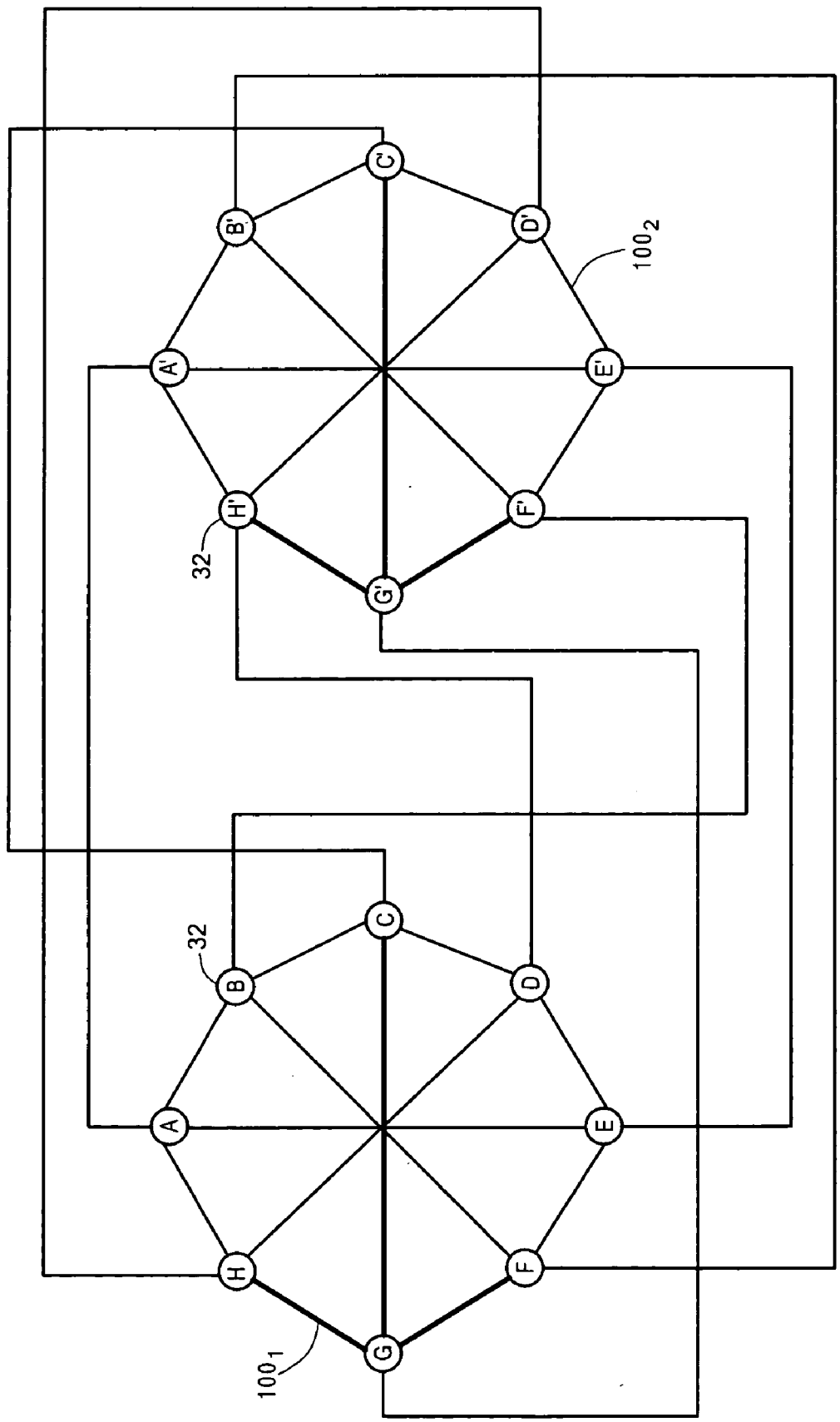
FIG. 9B is a diagram of a data storage system according to the invention as configured in FIG. 7 having sixteen director/memory boards interconnected differently from the interconnections shown in FIG. 9A, here such interconnections having a minimum number of nodal transport hops.

Referring to FIG. 9B an arrangement is shown which eliminates this two-hop condition. Here, the connection of the nodes of network $100_1$ to the nodes of network $100_2$ are presented in below:

Node A of network $100_1$ is connected directly to Node A of network $100_2$;
Node B of network $100_1$ is connected directly to Node F of network $100_2$;
Node C of network $100_1$ is connected directly to Node C of network $100_2$;
Node D of network $100_1$ is connected directly to Node H of network $100_2$;
Node E of network $100_1$ is connected directly to Node E of network $100_2$;
Node F of network $100_1$ is connected directly to Node B of network $100_2$;
Node G of network $100_1$ is connected directly to Node G of network $100_2$;
Node H of network $100_1$ is connected directly to Node D of network $100_2$.

Thus, it is noted that here and considering node G of network $100_1$, such node is directly connected to node G of network $100_2$. It is further noted that two of the nodes H and F of network $100_1$ which are directly connected to node G of node $100_1$ are connected to nodes of network $100_2$ which are indirectly connected to node G of network $100_2$.

Thus, in general, here each one of the packet switching networks includes: a plurality of crossbar switches, each crossbar switch being connected: (1) directly to crossbar switches of at least two other ones of crossbar switches in such one of the packet switching networks and to one of the crossbar switches of a second one of the plurality of packet switching networks; and, (2) indirectly to other ones of the crossbar switches of such one of the packet switching networks via the crossbar switch directly connected to such one of the packet switching fabric. Two of said at least two other ones of the crossbar switches in such one of the packet switching networks are connected indirectly to two crossbar switches of the second one of the packet switching networks, such two crossbar switches of the second one of the packet switching networks being crossbar switches connected indirectly to said one of the crossbar switches of the second one of the plurality of packet switching networks.

Figure 9C:
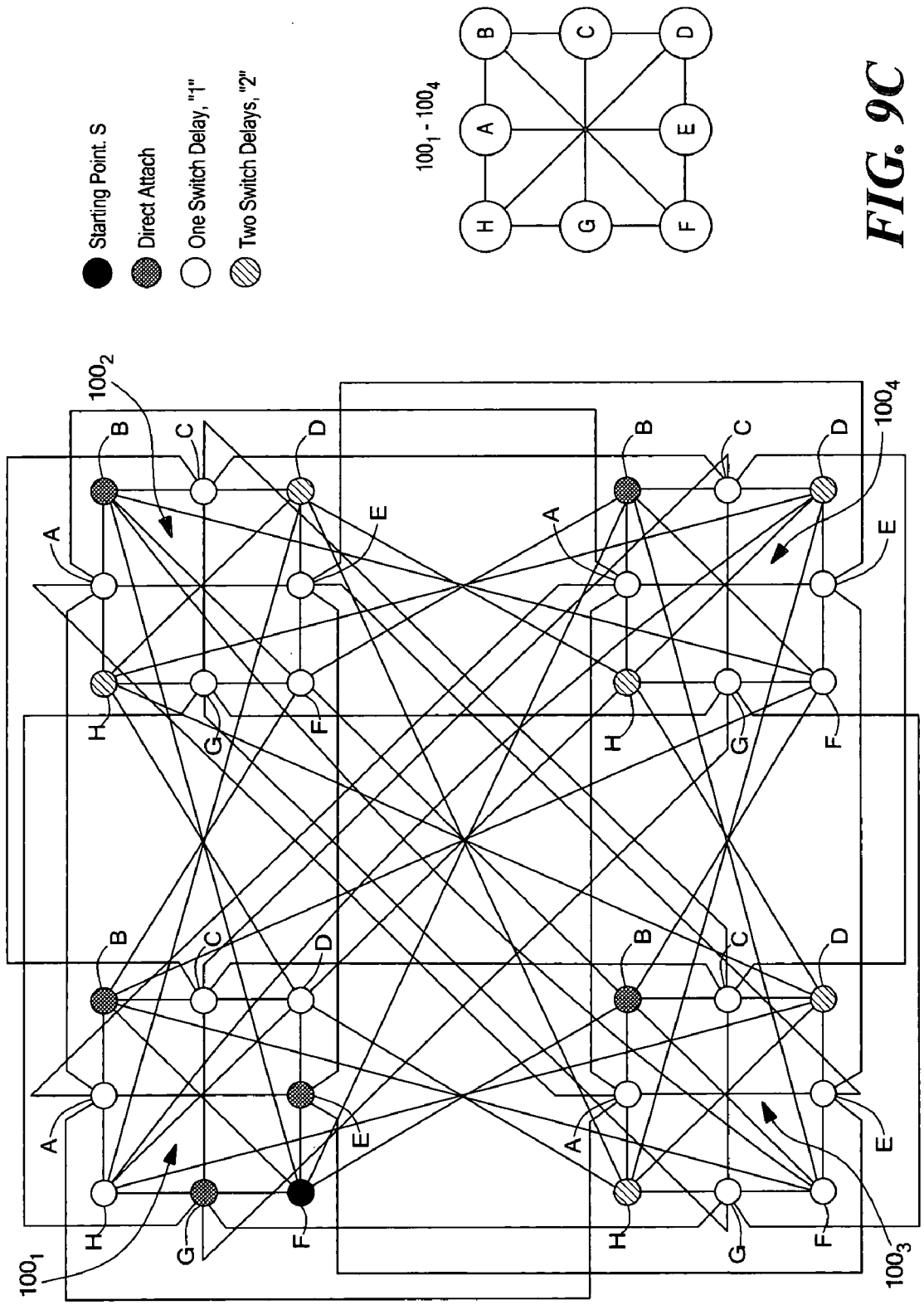
FIG. 9C is a diagram of a data storage system according to the invention as configured in FIG. 7 having thirty-two director/memory boards interconnected according to the invention.

Referring now to FIG. 9C, an arrangement is shown for interconnecting 32 nodes using four of the networks 100 sown in FIG. 8; i.e., networks $100_1$–$100_4$. The nodes are interconnected using the principle set forth above in connection with FIG. 9B. Thus, the interconnections are as forth below:

| Network $100_1$: | Network $100_2$ | Network $100_3$ | Network $100_4$ |
|---|---|---|---|
| A-E | A-E | A-E | A-E |
| B-F | B-F | B-F | B-F |
| C-G | C-G | C-G | C-G |

-continued

| Network $100_1$: | Network $100_2$ | Network $100_3$ | Network $100_4$ |
|---|---|---|---|
| D-H | D-H | D-H | D-H |
| A-B | A-B | A-B | A-B |
| B-C | B-C | B-C | B-C |
| C-D | C-D | C-D | C-D |
| D-E | D-E | D-E | D-E |
| E-F | E-F | E-F | E-F |
| F-G | F-G | F-G | F-G |
| G-H | G-H | G-H | G-H |
| H-A | H-A | H-A | H-A |

Interconnects:
Node A of network $100_1$ is connected directly to Node A of network $100_2$;
Node B of network $100_1$ is connected directly to Node F of network $100_2$;
Node C of network $100_1$ is connected directly to Node C of network $100_2$;
Node D of network $100_1$ is connected directly to Node H of network $100_2$;
Node E of network $100_1$ is connected directly to Node E of network $100_2$;
Node F of network $100_1$ is connected directly to Node B of network $100_2$;
Node G of network $100_1$ is connected directly to Node G of network $100_2$;
Node H of network $100_1$ is connected directly to Node D of network $100_2$;
Node A of network $100_1$ is connected directly to Node A of network $100_3$;
Node B of network $100_1$ is connected directly to Node F of network $100_3$;
Node C of network $100_1$ is connected directly to Node C of network $100_3$;
Node D of network $100_1$ is connected directly to Node H of network $100_3$;
Node E of network $100_1$ is connected directly to Node E of network $100_3$;
Node F of network $100_1$ is connected directly to Node B of network $100_3$;
Node G of network $100_1$ is connected directly to Node G of network $100_3$;
Node H of network $100_1$ is connected directly to Node D of network $100_3$;
Node A of network $100_1$ is connected directly to Node A of network $100_4$;
Node B of network $100_1$ is connected directly to Node F of network $100_4$;
Node C of network $100_1$ is connected directly to Node C of network $100_4$;
Node D of network $100_1$ is connected directly to Node H of network $100_4$;
Node E of network $100_1$ is connected directly to Node E of network $100_4$;
Node F of network $100_1$ is connected directly to Node B of network $100_4$;
Node G of network $100_1$ is connected directly to Node G of network $100_4$;
Node H of network $100_1$ is connected directly to Node D of network $100_4$;
Node A of network $100_2$ is connected directly to Node A of network $100_3$;
Node B of network $100_2$ is connected directly to Node F of network $100_3$;
Node C of network $100_2$ is connected directly to Node C of network $100_3$;
Node D of network $100_2$ is connected directly to Node H of network $100_3$;
Node E of network $100_2$ is connected directly to Node E of network $100_3$;
Node F of network $100_2$ is connected directly to Node B of network $100_3$;
Node G of network $100_2$ is connected directly to Node G of network $100_3$;
Node H of network $100_2$ is connected directly to Node D of network $100_3$;
Node A of network $100_2$ is connected directly to Node A of network $100_4$;
Node B of network $100_2$ is connected directly to Node F of network $100_4$;
Node C of network $100_2$ is connected directly to Node C of network $100_4$;
Node D of network $100_2$ is connected directly to Node H of network $100_4$;
Node E of network $100_2$ is connected directly to Node E of network $100_4$;
Node F of network $100_2$ is connected directly to Node B of network $100_4$;
Node G of network $100_2$ is connected directly to Node G of network $100_4$;
Node H of network $100_2$ is connected directly to Node D of network $100_4$;
Node A of network $100_3$ is connected directly to Node A of network $100_4$;
Node B of network $100_3$ is connected directly to Node F of network $100_4$;
Node C of network $100_3$ is connected directly to Node C of network $100_4$;
Node D of network $100_3$ is connected directly to Node H of network $100_4$;
Node E of network $100_3$ is connected directly to Node E of network $100_4$;
Node F of network $100_3$ is connected directly to Node B of network $100_4$;
Node G of network $100_3$ is connected directly to Node G of network $100_4$;
Node H of network $100_3$ is connected directly to Node D of network $100_4$;

Thus, considering node F of network $100_1$ as a staring node for example, it is noted that connections from such node F of network 100₁ to all other nodes are direct except for: nodes indicated by "1" which have one hop; and nodes indicated by "2" which have two hops. Thus, there are 16 one-hop interconnections and 6 two-hop interconnections.

Figure 10:
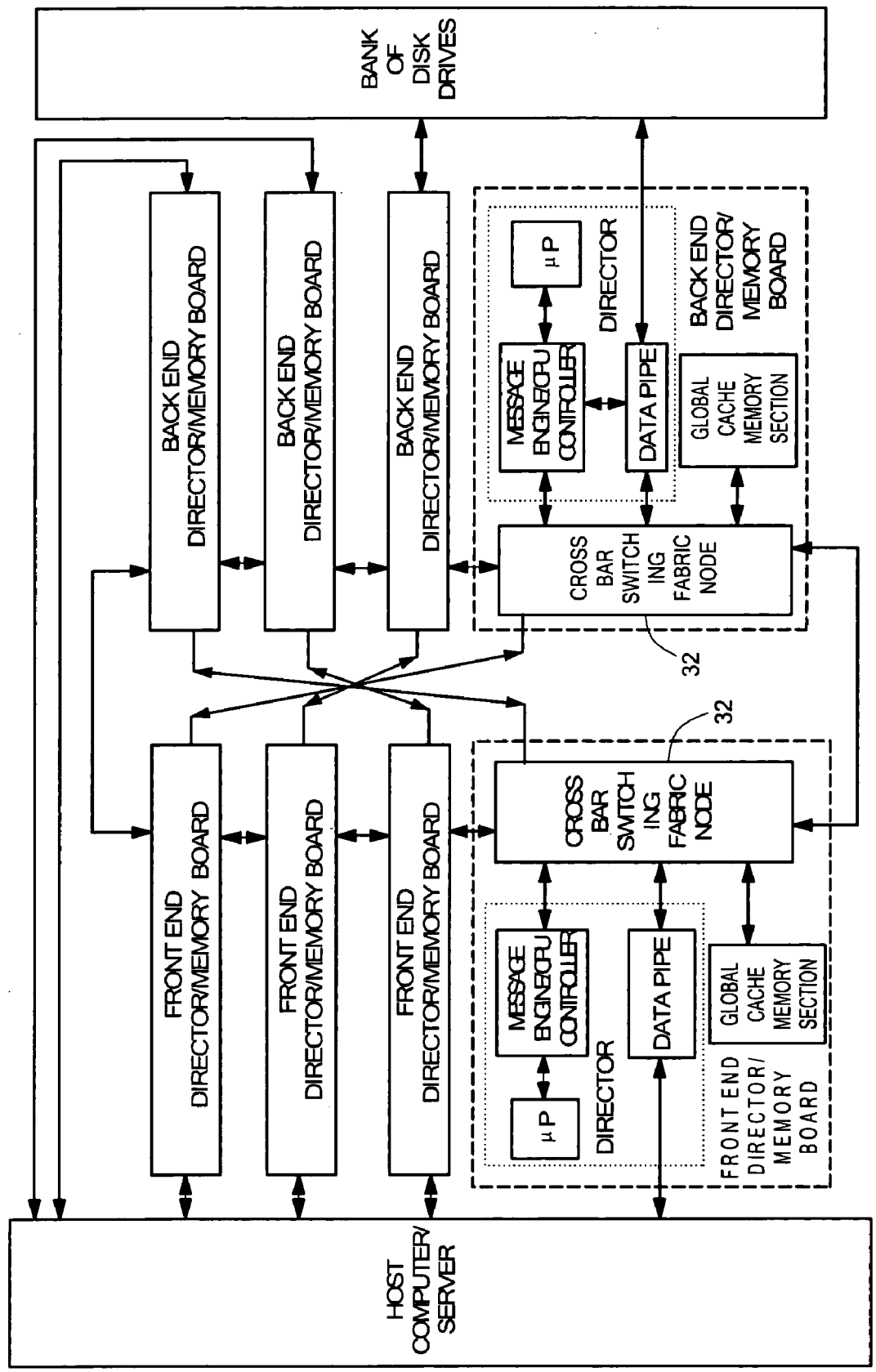
FIG. 10 is a block diagram of a data storage system according to yet another embodiment of the invention.

Referring now to FIG. 10, an unbalanced system is shown. That is, here there are six front end director/memory boards and two back end director/memory boards. It follows that other arrangements are equivalent, e.g., six back end and two from end, for example.

Figure 11:
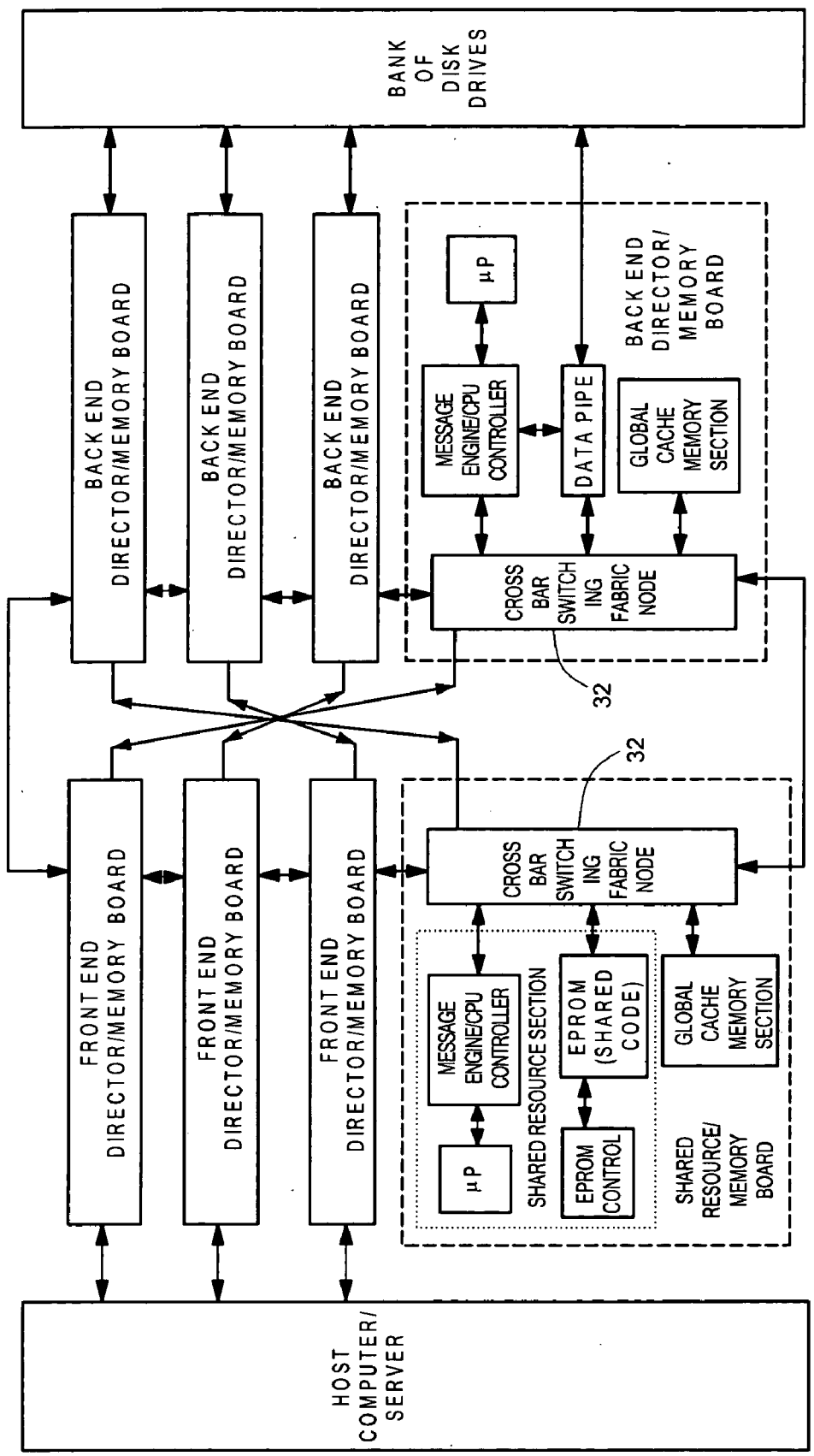
FIG. 11 is a block diagram of a data storage system according to yet another embodiment of the invention, here such system having a shared code storage section.

Referring now to FIG. 11, another embodiment is shown. Here, there are three front-end director/memory boards, four back end director/memory boards, and a shared resource board. The stored resource board includes a crossbar switch connected to the back and front end director/memory boards as described above in connection with FIG. 8. Here the crossbar switch of the code storage section/memory board is coupled to a global cache memory section and a shared code storage section. The shared resource board includes a shared resource section which includes a microprocessor and message engine/CPU controller described above, a memory, here an EPROM having stored therein computer code used by the front end and back end directors and an EPROM controller, arranged as shown. The shared resource section also includes a maintenance network connection accessible from sources and test equipment, not shown, external to the system interface. Such connection allows for updates in code which may now be shared by all directors. The shared resource section also enables reset (i.e. boot-up control) and creation of the routing table described above. These features are particularly useful as the system interface becomes updated. It also enables environmental monitoring of the system.

The EPROM stores shared resources (i.e., resources shared by the front end and back end directors) and other system resources. Such an arrangement allows for code updates through replacement of this shared code storage section/memory board. It should be understood that the board may be made without the shared memory section thereon. The code stored in the EPROM may include the boot-up code for the CPUs of the front end and back end directors, configuration data, emulation data code, diagnostic code. It is noted that the code in the EPROM can be transferred to the message engine/CPU controller and shared memory section on the shared code storage section/memory board via the crossbar switch on such shared code storage section/memory board.

It should be understood that the use of an EPROM is an example of one such device, used to hold code images that can be loaded by the various directors. Thus other devices include, for example, non-volatile RAM (NVRAM) for status and error logging, Time-of-Day clock, Enclosure management, Fabric initialization hardware and software, storage system and data storage management utilities, debug access ports and support, and global routing information.

Figure 12:
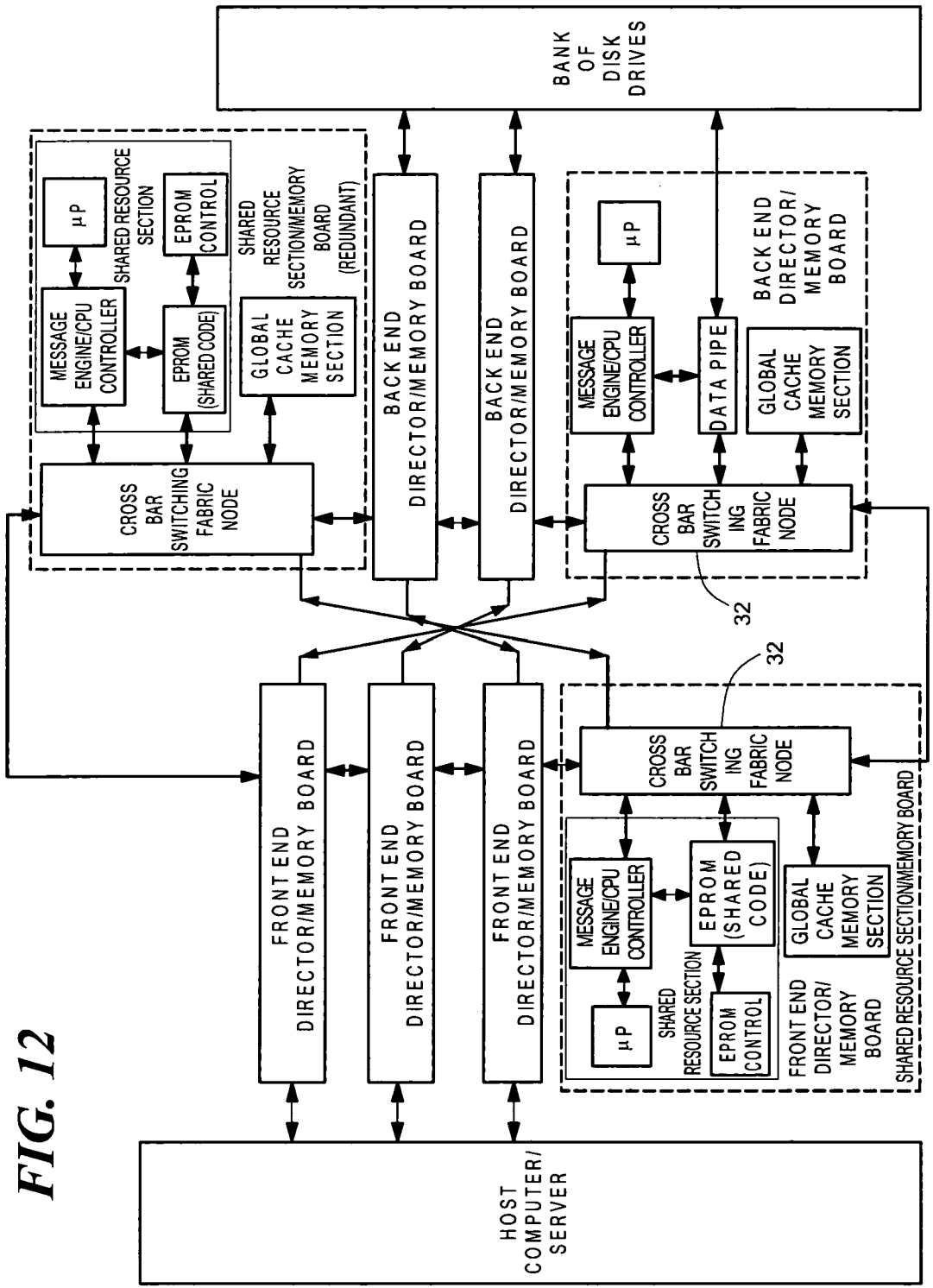
FIG. 12 is a more detailed block diagram of a director used in the system of FIG. 2.

Referring now to FIG. 12, another embodiment is shown. Here, there are three front end director/memory boards, three back end director/memory boards, and a pair of shared code storage section/memory boards. The second shared code storage section/memory board provides redundancy in the event that one of the pair of storage section/memory board fails.

Figure 13:
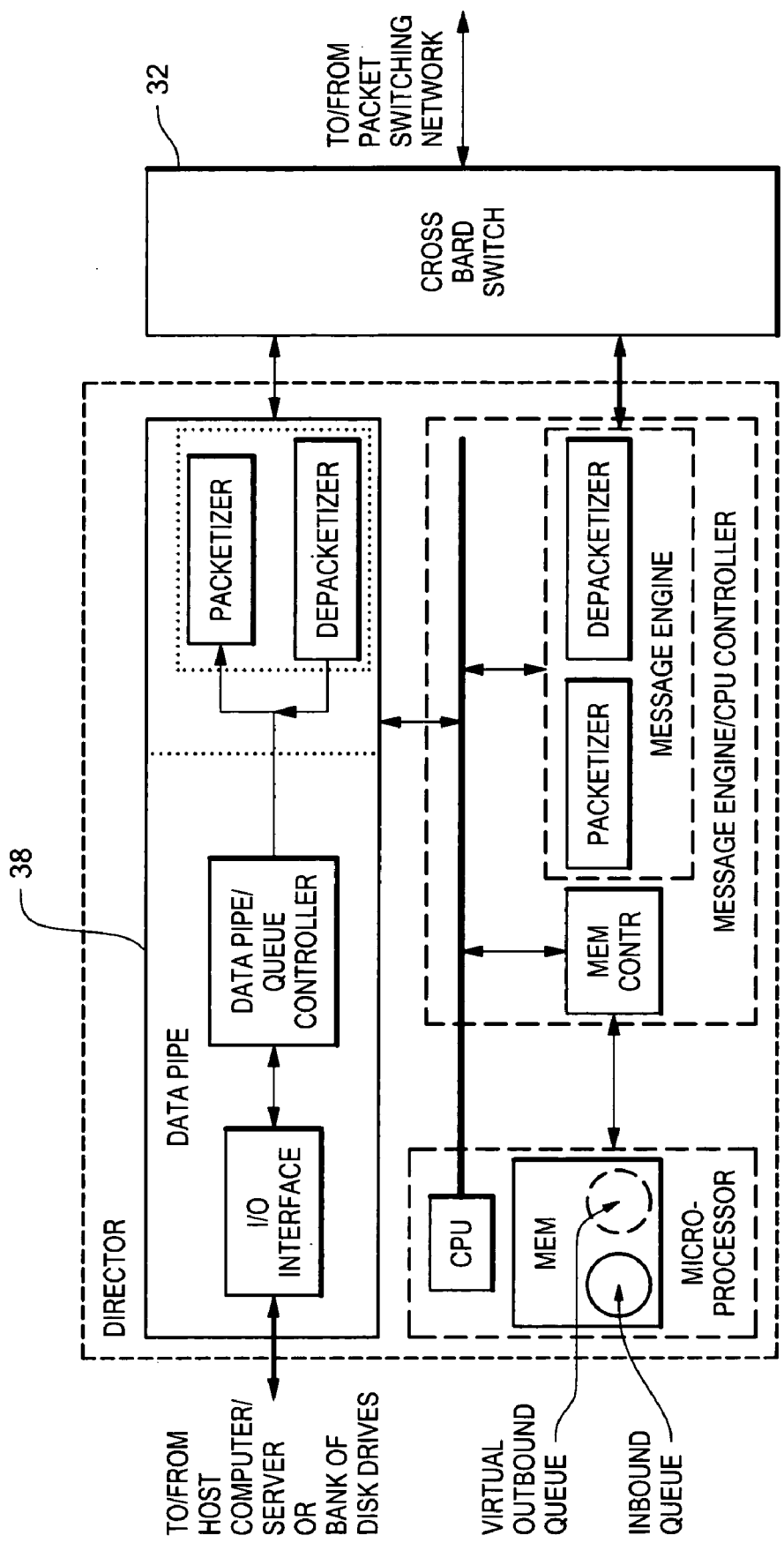
FIG. 13 is a block diagram of a data storage system having a shared code storage section according to yet another embodiment of the invention.

Referring now to FIG. 13, the director shown in FIG. 3 is shown in more detail. Thus, the data pipe 38 is shown to include an input/output (I/O) interface, a data pipe/Queue controller as well as the packetizer and depacketizer. Note that the data pipe/queue controller includes an I/O memory and a translation table to be described in more detail below. Suffice it to say here that the I/O interface memory does not include a section for an inbound queue for reasons to be described below. The queue for inbound messages are stored in the CPU memory of the director which is to execute the inbound message and hence a "virtual" queue is shown dotted in the I/O interface memory, it being understood that such memory does not store inbound messages producer or consumer indices.

The microprocessor memory (i.e., the CPU memory) is shown to include in a section thereof an inbound queue. It is noted that the microprocessor memory does not include a section for an outbound queue for reasons to be described below. The queue for outbound messages are stored in the I/O interface memory of the director which is to execute the inbound message and hence a "virtual" queue is shown dotted in the microprocessor memory, it being understood that such memory is not required to store outbound message's producer or consumer indices.

Figure 14:
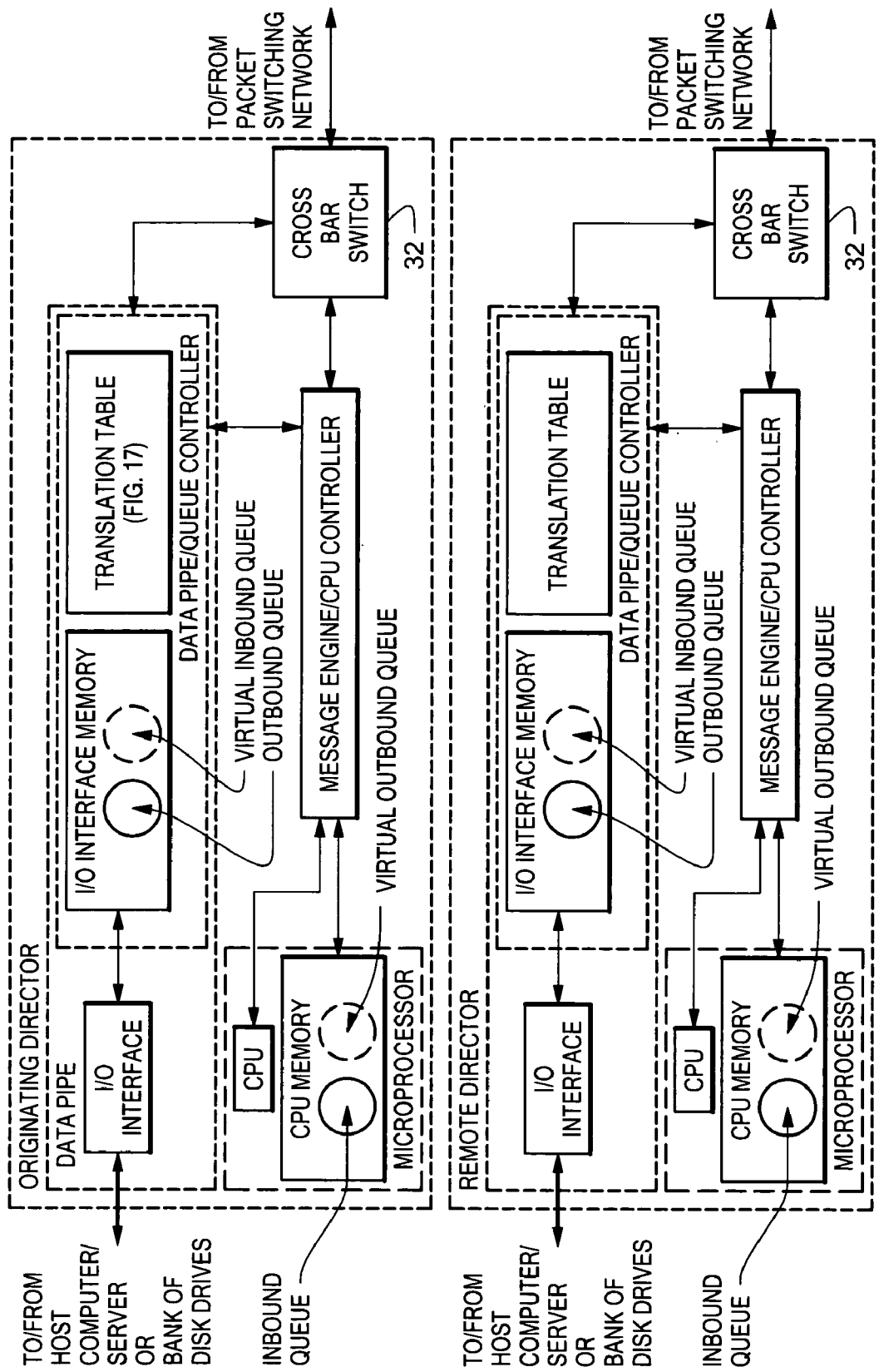
FIG. 14 is a more detailed block diagram of a pair of the directors shown in FIG. 3.

Referring now to FIG. 14, a pair of the directors is shown. Note that for purposes of describing the operation of the directors one of the pair of directors will be referred to as an originating director and the other the remote director.

Figure 15B:
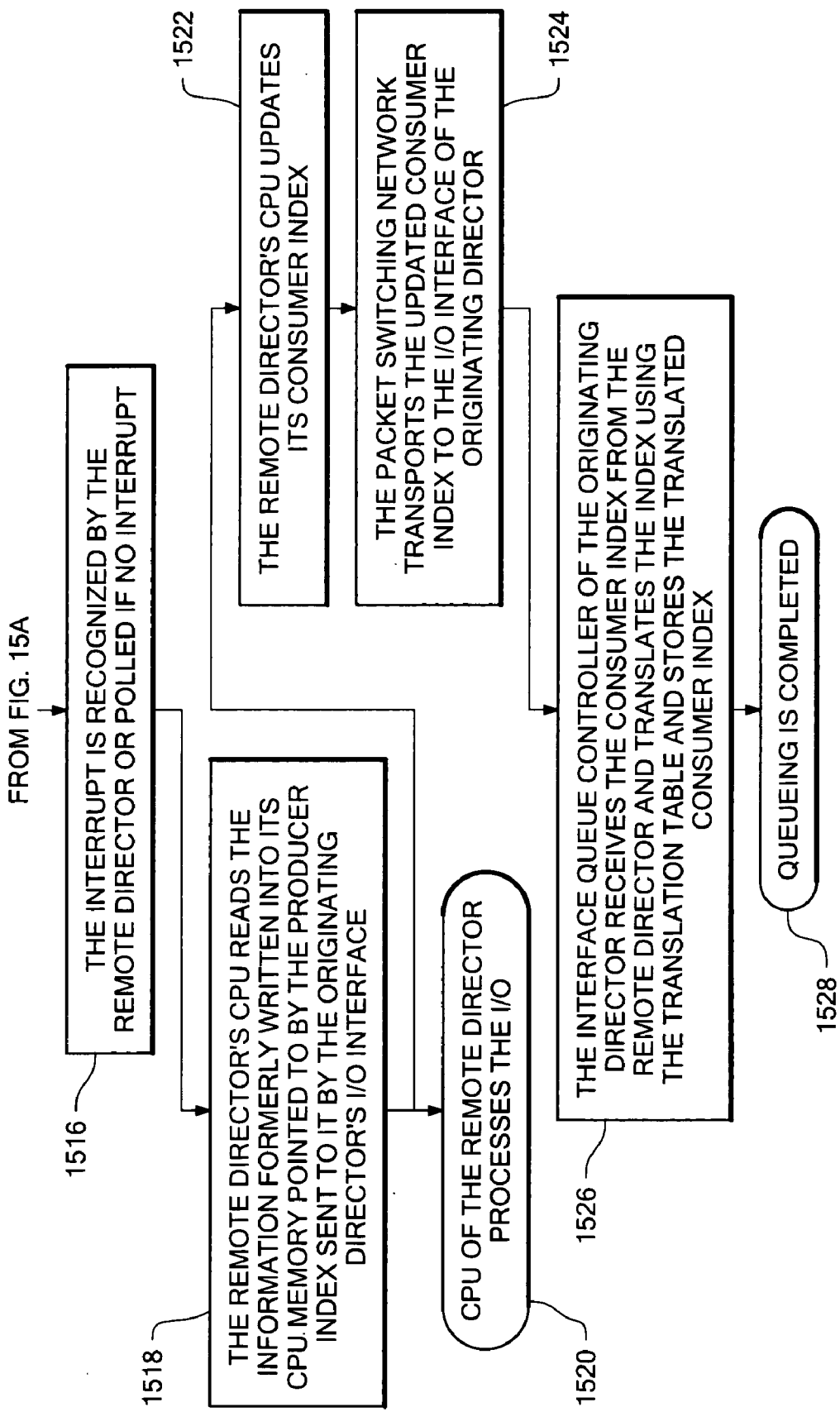
FIG. 15 is a flow diagram shows the processing of inbound information (i.e., messages) from an originating director of FIG. 14, to the remote director of FIG. 14.
Figure 16A:
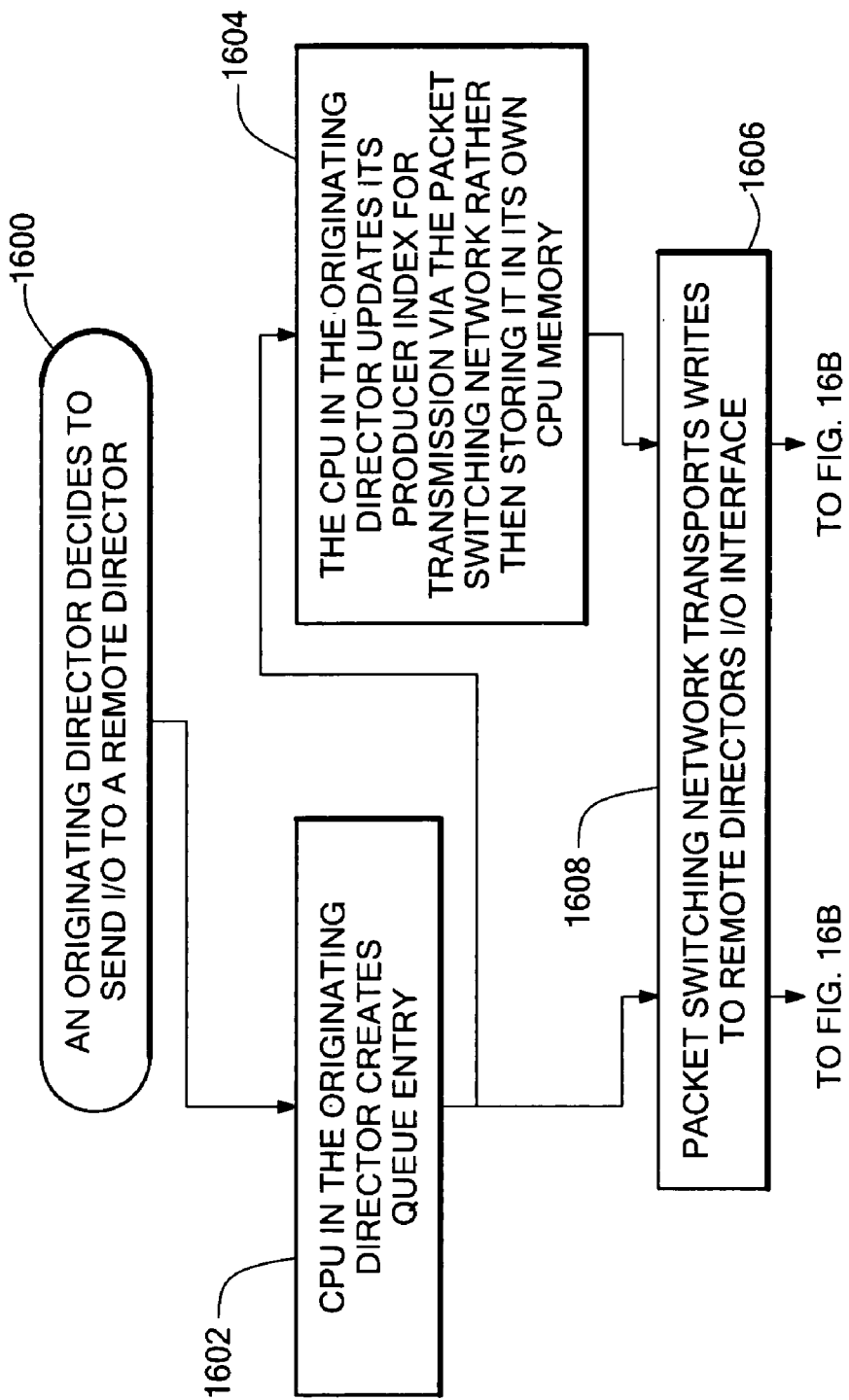
FIG. 16 is a flow diagram shows the processing of outbound information (i.e., messages) from the remote director of FIG. 14 to the originating director of FIG. 14.
Figure 16B:
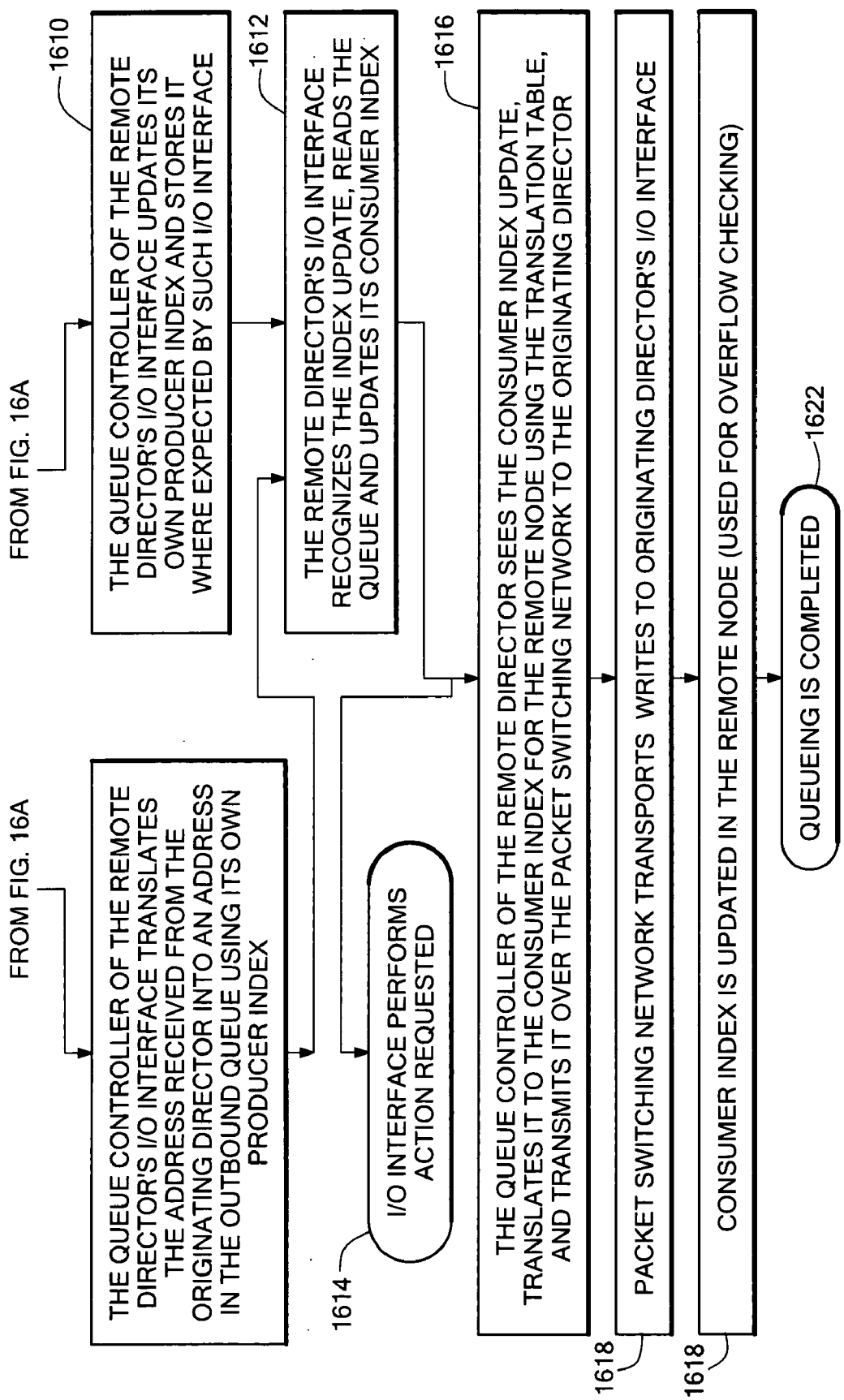

Referring also to FIGS. 15 and 16, FIG. 15 is a flow diagram shows the processing of inbound information (i.e., messages) from the originating director to the remote director and FIG. 16 is a flow diagram shows the processing of outbound information (i.e., messages) from the remote director to the originating director.

Thus, referring to FIG. 15, an I/O (i.e., information) arrives at the I/O interface of the originating director, Step 1500. The I/O interface of the originating director creates a queue entry, Step 1502. The queue controller of the I/O interface of the originating director translates the address of the queue entry into an address for a remote director using a translation table (FIG. 17) and packetizes the queue information for transmission on the packet switching network to the remote director, Step 1504. Also, the I/O interface of the originating director updates its producer index. Step 1506. The queue controller of the originating director translates the updated producer index using the translation table (FIG. 17), packetizes it, and then writes the translated producer index for the remote director's CPU memory's inbound queue rather than storing it in the I/O interface memory, Step 1508. Also, the I/O interface of the originating director asserts an interrupt request (optional). It is also checks that the producer index does not exceed the consumer index (i.e., an overflow condition).

Step 1510. The queue controller of the originating director relays the interrupt to the remote director via the packet switching network (optional), Step 1512.

The packet switching network transports the writes and interrupt to the remote director via the packet switching network, Step 1514.

The interrupt is recognized by the remote director or the producer index is polled if there is no interrupt, Step 1516.

The remote director's CPU reads the information formerly written into it's CPU memory pointed to by the producer index sent to it by the originating director's queue controller. Step 1518. The CPU of the remote director processes the I/O, Step 1520. Also, the remote director's CPU updates its consumer index, Step 1522. The packet switching network transports the updated consumer index to the I/O interface of the originating director, Step 1524. The interface queue controller of the originating director receives the consumer index from the remote director and translates the index using the translation table and stores the translated consumer index, Step 1526. The inbound queuing is completed, Step 1528.

Thus, referring to FIG. 16, an originating director decides to send an I/O to a remote director, Step 1600. The CPU in the originating director creates a queue entry, Step 1602. Also, the CPU in the originating director updates its producer index for transmission via the packet switching network rather than storing it in its own CPU memory, Step 1604.

The packet switching network transports writes to the remote director's I/O interface, Step 1606.

The queue controller of the remote director's I/O interface translates the address received from the originating director into an address in the outbound queue using it's own producer index, Step 1608. The queue controller of the remote director's I/O interface updates its own producer index and stores it where expected by such I/O interface, Step 1610. The remote director's I/O interface recognizes the index update, reads the queue and updates its consumer index, Step 1612. The I/O interface performs the action required, Step 1614. Also, the queue controller of the remote director sees the consumer index update, translates it to the consumer index for the remote director using the translation table (FIG. 17) and transmits it over the packet switching network to the originating director, Step 1616. The packet switching network transports writes to the originating director's I/O interface, Step 1618. The consumer index is updated in the remote director (used for overflow control), Step 1620. Outbound queuing is completed, Step 1622.

Referring now to FIG. 17, the translation table is shown. The address for the table, f(x), is a function that takes some part of the information in the queue entry and derives an address into the table from it. For example, in the queue entry, there may be a transaction ID, a host address, a logical device number, or some field that groups queue entries into some logical order. In other cases, the function could simply be a counter, taking each entry to the next in the translation table. The "Misc. Remote Info" may contain other information needed to access the remote node, such as security keys, queue length, task divisioning, table checksums and validity notes, preferences for interrupt, and "scoreboard", for example.

In addition to this table, two registers are maintained: "Local Producer Index{and "Local Consumer Index: These indices (or pointers) are the ones that the I/O Interface sees and operates with. There can be multiple queues in either direction; therefore, the "Remote Producer Index" entry in the translation table could be actually two indices representing two separate queues with this one translation table. If the address offset is the same as the Remote CPU Number, then no field in the table is required. In some cases, a Remote Producer Index is not required. If the I/O Interface does not supply a Producer Index, the Translation Table is a mechanism for synthesizing one. The update of the Remote Producer Index can be programmed to produce an interrupt to the Remote CPU even if the local I/O Interface does not generate one, A number of embodiments of the invention have been described. Nevertheless, it will be understood that various modifications may be made without departing from the spirit and scope of the invention. Accordingly, other embodiments are within the scope of the following claims.

What is claimed is:

1. A system interface, comprising:
    a packet switching network comprising a plurality of crossbar switches;
    a cache memory;
    a plurality of directors, one portion of such directors being coupled to a host computer/server and another portion of the directors being adapted for coupling to a bank of disk drives, the plurality of directors and cache memory being interconnected through the packet switching network;
    each one of the directors being coupled to a corresponding one of the plurality of crossbar switches;
    wherein the corresponding one of the plurality of crossbar switches is directly connected to at least two other ones of the plurality of crossbar switches and indirectly connected to of other ones of the crossbar switches through the at least two directly connected crossbar switches.

2. The system interface recited in claim 1 wherein the system interface includes a plurality of the packet switching networks, each one of the packet switching networks including:
    a plurality of crossbar switches, each crossbar switch being connected: (1) directly to crossbar switches of at least two other ones of crossbar switches in such one of the packet switching networks and to at least two of the crossbar switches of a second one of the plurality of packet switching networks; and, (2) indirectly to other ones of the crossbar switches of such one of the packet switching networks via the crossbar switch directly connected to such one of the packet switching network, two of said at least two other ones of the crossbar switches in such one of the packet switching networks being connected indirectly to other ones of the crossbar switches of the second one of the packet switching networks, the two crossbar switches of the second one of the packet switching networks being crossbar switches connected indirectly to said one of the crossbar switches of the second one of the plurality of packet switching networks.

3. The system interface recited in claim 1 wherein the cache memory includes a plurality of cache memory sections, each one of such sections being coupled to a corresponding one of the crossbar switches.

4. The system interface recited in claim 3 wherein the packet switching network comprises the crossbar switches of the directly and indirectly connected crossbar switches.

5. The system interface recited in claim 4 wherein the system interface includes a plurality of the packet switching networks, each one of the packet switching networks including:
    a plurality of crossbar switches, each crossbar switch being connected: (1) directly to crossbar switches of at least two other ones of crossbar switches in such one of the packet switching networks and to at least two of the crossbar switches of a second one of the plurality of packet switching networks; and, (2) indirectly to other ones of the crossbar switches of such one of the packet switching networks via the crossbar switch directly connected to such one of the packet switching network, two of said at least two other ones of the crossbar switches in such one of the packet switching networks being connected indirectly to other ones of the crossbar switches of the second one of the packet switching networks, the two crossbar switches of the second one of the packet switching networks being crossbar switches connected indirectly to said one of the crossbar switches of the second one of the plurality of packet switching networks.

* * * * *